United States Patent [19]
Inoguchi et al.

[11] Patent Number: 5,189,785
[45] Date of Patent: Mar. 2, 1993

[54] APPARATUS FOR INSERTING THRUST METAL INSERTS BETWEEN CYLINDER BLOCK AND CRANKSHAFT, BY ROTATING CRANKSHAFT

[75] Inventors: Mitsumoto Inoguchi; Kenji Manabe; Hitomi Itoh, all of Toyota, Japan

[73] Assignee: Toyota Jidosha Kabushiki Kasiha, Japan

[21] Appl. No.: 781,905

[22] Filed: Oct. 24, 1991

[30] Foreign Application Priority Data

Oct. 25, 1990 [JP] Japan .................................. 2-289754

[51] Int. Cl.$^5$ .............................................. B23Q 7/00
[52] U.S. Cl. ...................................... 29/809; 29/281.1; 29/240; 29/888.08; 29/888.01; 29/898.07; 901/40
[58] Field of Search ............... 29/6.01, 240, 281.1, 29/888.08, 888.01, 898.041, 898.07, 898.1, 809, DIG. 14, 703; 269/21; 901/6, 40, 46, 47

[56] References Cited

U.S. PATENT DOCUMENTS 2,807,973 10/1957 Meyer et al. ..................... 29/601 X
4,644,624 2/1987 Fontana ........................... 29/898.041
4,872,257 10/1989 Wakamori et al. ................ 29/703 X

FOREIGN PATENT DOCUMENTS 56-102439 8/1981 Japan ...................................... 29/6.01

Primary Examiner—Mark Rosenbaum
Assistant Examiner—S. Thomas Hughes
Attorney, Agent, or Firm—Finnegan, Henderson, Farabow, Garrett & Dunner

[57] ABSTRACT

An apparatus operable for inserting an arcuate thrust metal insert into an arcuate gap defined by a surface of a crank arm of a crankshaft and an arcuate groove formed on an end face of a bearing portion of a cylinder block, when the crankshaft is positioned on the cylinder block such that a journal formed adjacent to the crank arm of the crankshaft is fitted on an arcuate concave bearing surface of the bearing portion. The apparatus includes a device for holding the insert and positioning the insert at a circumferential position of the journal opposite to the arcuate bearing surface of the bearing portion diametrically of the journal, such that the insert is substantially concentric with the arcuate groove. The thus positioned insert is pressed by a pressing device against the crank arm, and the crankshaft is rotated by a rotating device about its axis, while the insert is forced against the crank arm, so that the insert is rotated with the crankshaft and inserted the arcuate gap, due to friction between the insert and the crank arm.

5 Claims, 22 Drawing Sheets

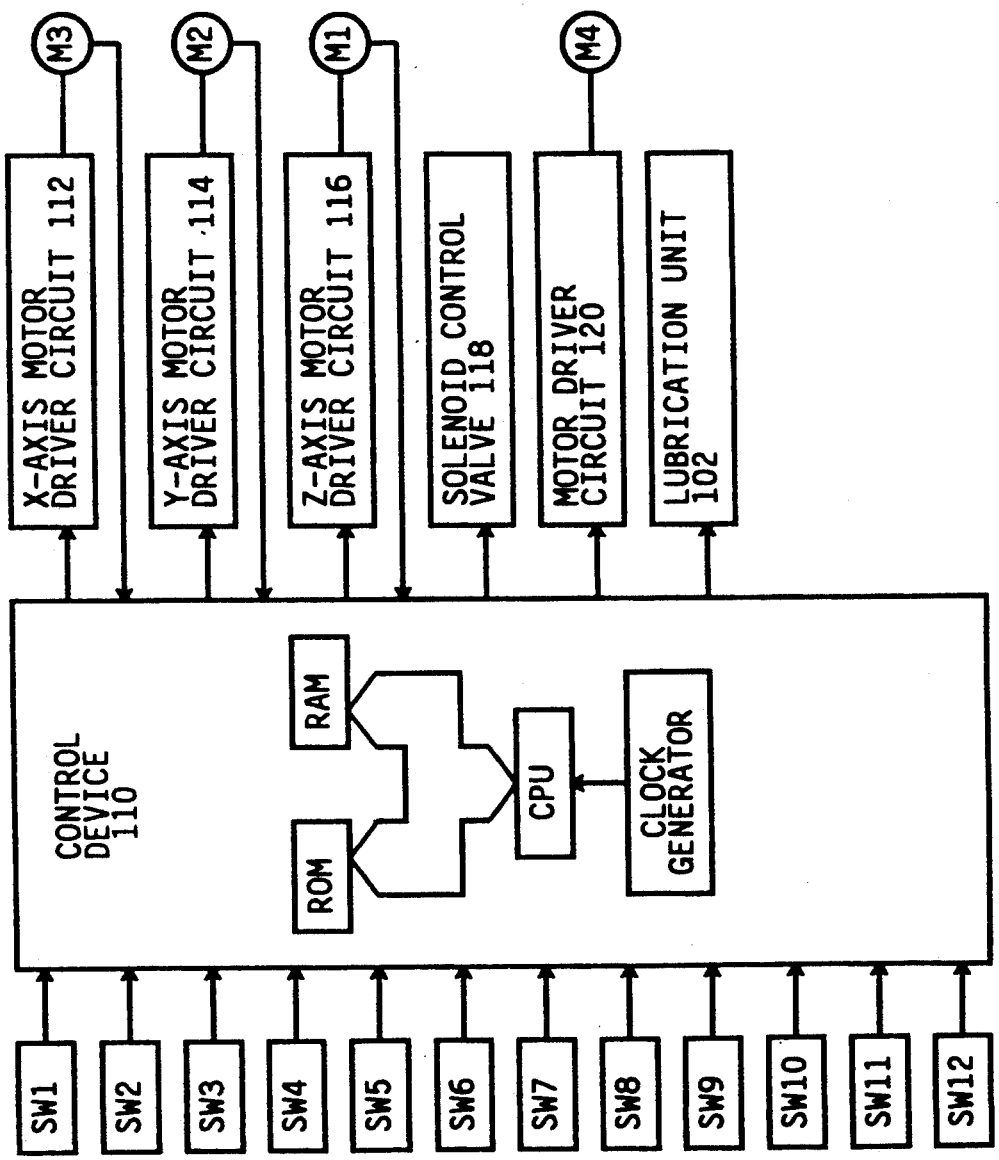

APPARATUS FOR INSERTING THRUST METAL INSERTS BETWEEN CYLINDER BLOCK AND CRANKSHAFT, BY ROTATING CRANKSHAFT

BACKGROUND OF THE INVENTION

1. Field of the Invention

The present invention relates to an apparatus for inserting thrust metal inserts between a cylinder block and a crankshaft when the crankshaft is mounted on the cylinder block.

2. Discussion of the Prior Art

A cylinder block of an engine has bearing portions for supporting journals of a crankshaft such that the crankshaft is rotatable about the axis of the journals. The crankshaft includes a main journal, and the bearing portion of the cylinder block which engages the main journal has a function of receiving axial thrust forces acting on the crankshaft and axially positioning the crankshaft, as well as receiving radial thrust forces from, the crankshaft. Usually, this bearing portion has grooves formed on the opposite end faces facing respective crank arms of the crankshaft, so that thrust metals are disposed in the grooves. Namely, the thrust metals are interposed between the bearing portion of the cylinder block and the adjacent two crank arms of the crankshaft. Generally, the bearing portion of the cylinder block has a semicircular concave bearing surface whose diameter corresponds to the diameter of the main journal. After the main journal is fitted on this concave bearing surface, a semicircular bearing cap is fitted on the main journal such that the bearing surface of the bearing portion of the cylinder block and the bearing cap cooperate to encircle the main journal of the crankshaft, for rotatably supporting the main journal. Usually, each of the thrust metals used for the main journal consists of two halves in the form of semicircular upper and lower inserts. After the crankshaft is positioned on the cylinder block, with one half of the circumference of the main journal engaging the appropriate bearing portion, one of the two semicircular inserts is inserted into the corresponding semicircular gap defined by the above-indicated groove on each side of the bearing portion facing the appropriate one of the two crank arms. The other semicircular insert is mounted when the bearing cap is fitted on the remaining half of the circumference of the main journal.

Since the thrust metal inserts have a thickness as small as 2 mm or so and since these inserts should be protected from damage, it has been considered difficult to automate the operation of inserting the above-indicated one thrust metal insert into the gap between the bearing portion of the cylinder block and the crank arms of the crankshaft. Conventionally, the insert is pressed into the gap by a worker's thumb while the crankshaft suitably positioned on the cylinder block is rotated about its axis.

The above job of inserting the thin-walled thrust metal inserts into the small gaps is cumbersome and time-consuming, and may injure the worker's thumb if the job continues a long time. Thus, the insertion of the thrust metal inserts is not an easy work, and its automation is desired for labor saving.

SUMMARY OF THE INVENTION

It is therefore an object of the present invention to provide a thrust metal inserting apparatus capable of automatically inserting thrust metal inserts between a crankshaft and a cylinder block, and freeing the engine assembly worker from the conventional manual job for the insertion of the thrust metal inserts.

The above object may be achieved according to the principle of the present invention, which provides a thrust metal inserting apparatus operable when a crankshaft having a journal and a crank arm at one end of the journal is positioned on a cylinder block having a bearing portion such that the journal is fitted on an arcuate concave bearing surface of the bearing portion, the bearing portion having an arcuate groove formed on an end face thereof along the arcuate bearing surface, so as to cooperate with a surface of the crank arm to define an arcuate gap, the apparatus operating to insert an arcuate thrust metal insert into the arcuate gap, the apparatus comprising: (a) positioning means for holding the thrust metal insert and positioning the insert at a circumferential position of the journal which is opposite to the arcuate bearing surface of the bearing portion in a diametric direction of the journal, such that the insert is substantially concentric with the arcuate groove; (b) pressing means for forcing the insert at the circumferential position against the surface of the crank arm; and (c) rotating means for rotating the crankshaft about an axis thereof, while the insert is forced against the surface of the crank arm by the pressing means, whereby the insert is rotated with the crankshaft and at least partially inserted into the arcuate gap, due to friction between the thrust metal insert and the surface of the crank arm.

In the thrust metal inserting apparatus of the present invention constructed as described above, the arcuate thrust metal insert is carried by the positioning means to be positioned at the predetermined circumferential position of the journal of the crankshaft, which is opposite to the arcuate bearing surface of the bearing portion of the cylinder block as viewed in the diametric direction of the journal, such that the arcuate insert is substantially concentric with the arcuate groove or arcuate gap. In this condition, the insert is forced by the pressing means against the surface of the crank arm which faces the end face of the bearing portion. With the insert pressed against the crank arm, the crankshaft is rotated about its axis by the rotating means, so that the insert is rotated with the crankshaft due to friction between the insert and the crank arm, and is at least partially inserted into the arcuate gap formed between the end face of the bearing portion and the surface of the crank arm, in the presence of the arcuate groove.

According to the present invention described above, the thrust metal insert may be automatically inserted into the arcuate gap, whereby the work load of the worker attending to the installation of the crankshaft on the cylinder block is considerably reduced. If the apparatus is adapted to assure complete insertion of the insert into the arcuate gap over the entire length of the insert, the insertion of the insert is completely automated.

Since the insert is inserted into the arcuate gap by rotating the crankshaft to thereby rotate the insert due to friction between the insert and the surface of the crank arm against which the insert is pressed, the insert which usually has a thin wall thickness is effectively protected against damage or deformation, which would occur if a gripper device is used for holding the insert and mechanically forcing the insert into the gap.

According to one preferred form of the invention, the pressing means comprises a thrust metal inserter in the form of a plate, and a pressurizing circuit. The inserter plate has an arcuate end face corresponding to the outer circumferential surface of the journal, an arcuate recess formed on a side surface thereof along the arcuate end face, and an air passage communicating with the arcuate recess. The pressurizing circuit is adapted to supply compressed air to said arcuate recess through said air passage, to thereby force the insert against the surface of the crank arm. This arrangement for forcing the insert against the crank arm does not have a risk of damaging or deforming the insert.

In the above form of the invention, the positioning means may comprise the thrust metal inserter, a vacuum circuit for applying vacuum pressure to the arcuate recess through the air passage to hold the insert by vacuum suction, and a control valve device for selective communication of the air passage with the pressurizing circuit or the vacuum circuit. According to this arrangement, the inserter is moved to a suitable thrust metal supply device, and operated to pick up the insert by vacuum suction with the air passage communicating with the vacuum circuit. The inserter picking up the insert is then moved to the predetermined position right above the journal of the crankshaft, and the control valve device is switched for communication of the air passage with the pressurizing circuit, for blowing the compressed air against the insert to thereby force the insert against the crank arm. In this arrangement, the positioning of the insert relative to the journal of the crankshaft and the operation to force the insert against the crank arm may be successively performed by merely switching the control valve device.

The thrust metal inserter may be provided with a lubricating hole open in its side surface, so that a lubricant is delivered from a lubrication unit to the inserter through the lubrication hole when the insert is forced against the crank arm by the compressed air. According to this arrangement, the adhesion of the insert with respect to the surface of the crank arm is increased, for facilitating the movement of the insert with the crankshaft. Further, the lubricant protects the insert against damage due to sliding contact with the crank arm.

Where the thrust metal inserter has the air passage selectively communicating with the pressurizing circuit or the vacuum circuit, it is preferable to provide the inserter with a pair of arcuate recesses formed on the opposite side surfaces of the plate, respectively, for holding a pair of thrust metal inserts by vacuum suction, so that the pair of thrust metal inserts are inserted into respective front and rear arcuate gaps formed between a pair of crank arms at opposite ends of the journal of the crankshaft and opposite end faces of the bearing portion of the cylinder block. In this case, the positioning means further comprises means for moving the thrust metal inserter in one of opposite axial directions of the crankshaft, together with the crankshaft, relative to the cylinder block, so as to enlarge an amount of the front arcuate gap before the crankshaft is rotated to insert one of the pair of inserts into the front arcuate gap, and moving the thrust metal inserter in the other of the opposite axial directions, together with the crankshaft, relative to the cylinder block, so as to enlarge an amount of the rear arcuate gap before the crankshaft is rotated to insert the other of the pair of inserts into the rear arcuate gap. According to this arrangement, the insertion of the inserts into the arcuate gaps is facilitated by enlargement of the gap size.

Where the arcuate insert is a semicircular insert to be inserted into the arcuate gap formed to cover one half of the entire circumference of the journal of the crankshaft, the arcuate insert can be entirely inserted into the arcuate gap by 180° rotation of the insert by the pressing and rotating means described above. However, the complete insertion of the insert by rotation of the crankshaft may take a long time, due to nicks and burrs and dimensional errors of the insert, friction between the insert and the cylinder block, and other factors which increase the resistance to movement of the insert into the arcuate gap. In view of this tendency, the thrust metal inserting apparatus is preferably equipped with pushing means having a pusher bar which is engageable with a trailing end of the arcuate thrust metal insert after at least a leading end portion of the arcuate insert has been inserted into the arcuate gap by rotation of the crankshaft by the rotating means. The pushing means is operated such that the pusher bar takes an arcuate path substantially along a part of an outer circumferential surface of the journal of the crankshaft, to completely insert the arcuate insert into the arcuate gap over the entire length of the insert. According to this preferred arrangement, the rotation of the crankshaft to insert the insert may be terminated a predetermined time after the rotating means is activated, namely, after the leading portion of the insert is inserted over a certain length into the arcuate gap. The pushing means reduces the overall time required for inserting the entire length of the insert into the arcuate gap, and makes it possible to fully automate the insertion, thereby freeing the worker from manual job. However, the pushing means may be dispensed with. In this case, the worker may manually push the partially inserted insert further into the gap, so that the entirety of the insert is received in the gap.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which:

FIG. 17 is a schematic block diagram showing a control system of the crankshaft installing system of FIG. 1, which includes various motor driver circuits;

DETAILED DESCRIPTION OF THE PREFERRED EMBODIMENT

Figure 1:
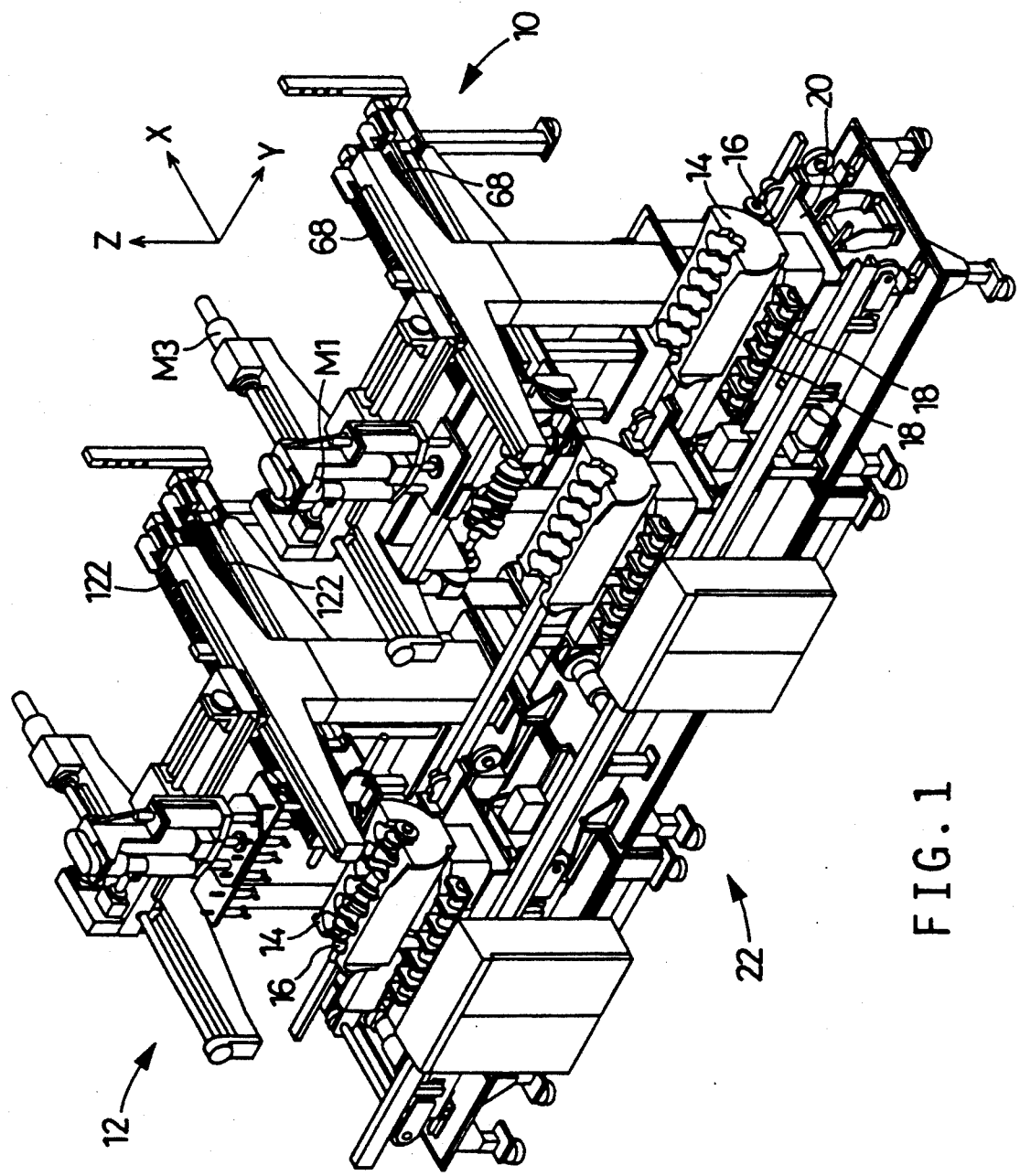
FIG. 1 is a perspective view showing a general arrangement of a crankshaft installing system which incorporates one embodiment of a thrust metal inserting apparatus of the present invention.
Figure 24:
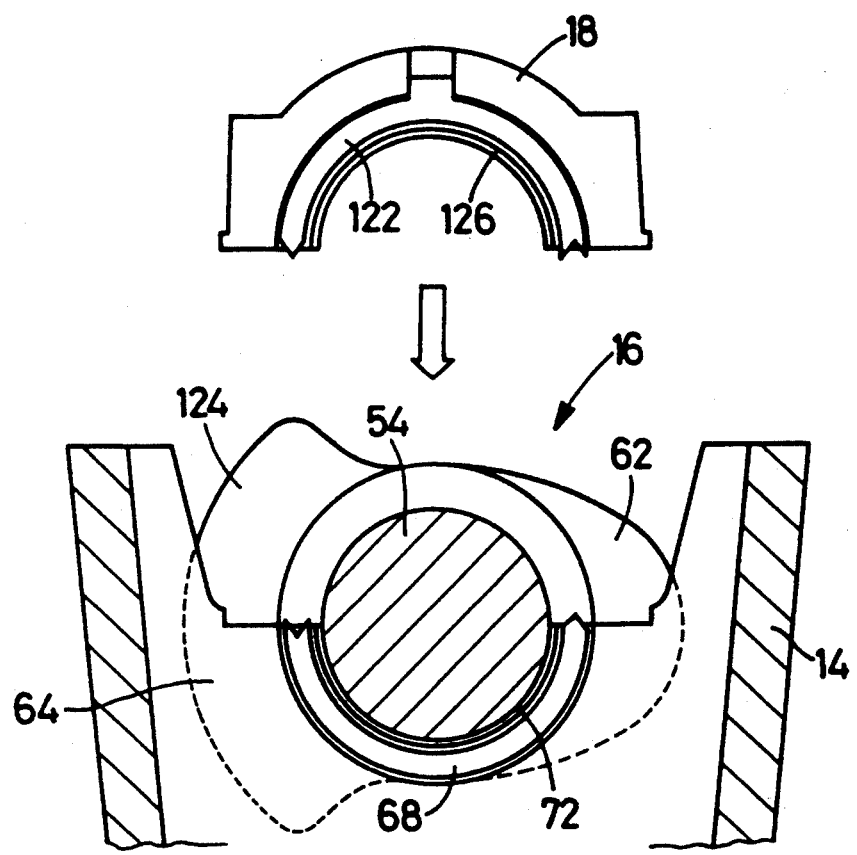
FIG. 24 is an elevational view showing a crankshaft and a thrust metal insert as installed on a cylinder block by the crankshaft installing system of FIG. 1, and the next step of installing a bearing cap on the crankshaft.

Referring first to the perspective view of FIG. 1, an assembly line for an automotive engine includes a crankshaft installing system 10 and a bearing cap mounting system 12, which are disposed in tandem. The crankshaft installing system 10 is adapted to install a crankshaft 16 on a cylinder block 14, and mount upper thrust metal inserts 68 between the cylinder block 14 and crankshaft 16, while the bearing cap mounting system 12 is adapted to mount a bearing cap 18 on the crankshaft 16, as shown in FIG. 24 and as described below in detail. The assembly line further includes a conveyor 22 disposed so as to extend in front of the crankshaft installing system 10 and bearing cap mounting system 12. The conveyor 22 is adapted to convey a plurality of pallets 20, each of which carries the cylinder block 14, crankshaft 16 and a given number of bearing caps 18, as indicated in FIG. 1. The conveyor 22 is controlled to position the pallets 20 at predetermined working stations provided in front of the respective systems 10, 12.

Figure 2:
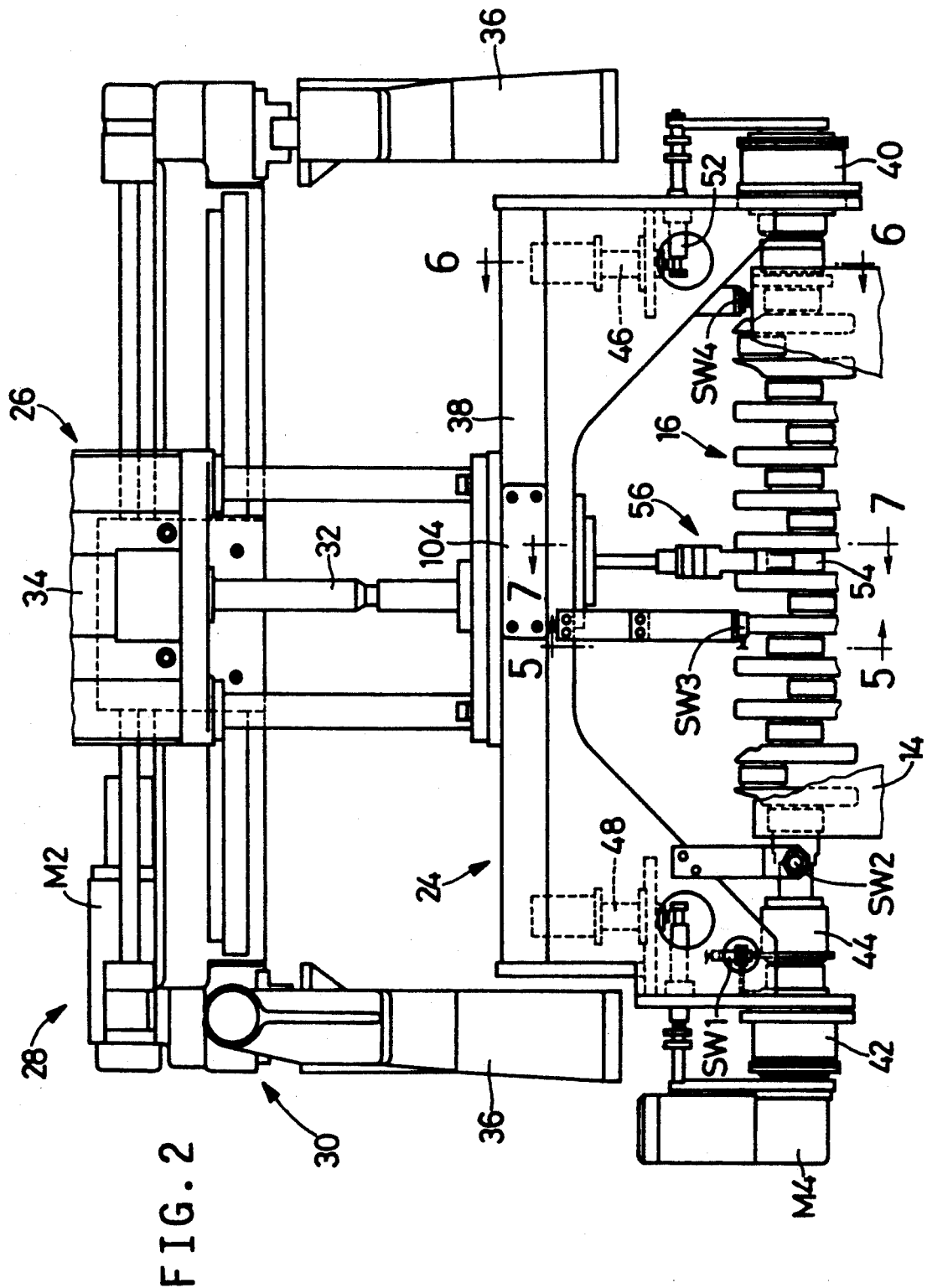
FIG. 2 is a fragmentary front elevational view of the crankshaft installing system of FIG. 1.
Figure 3:
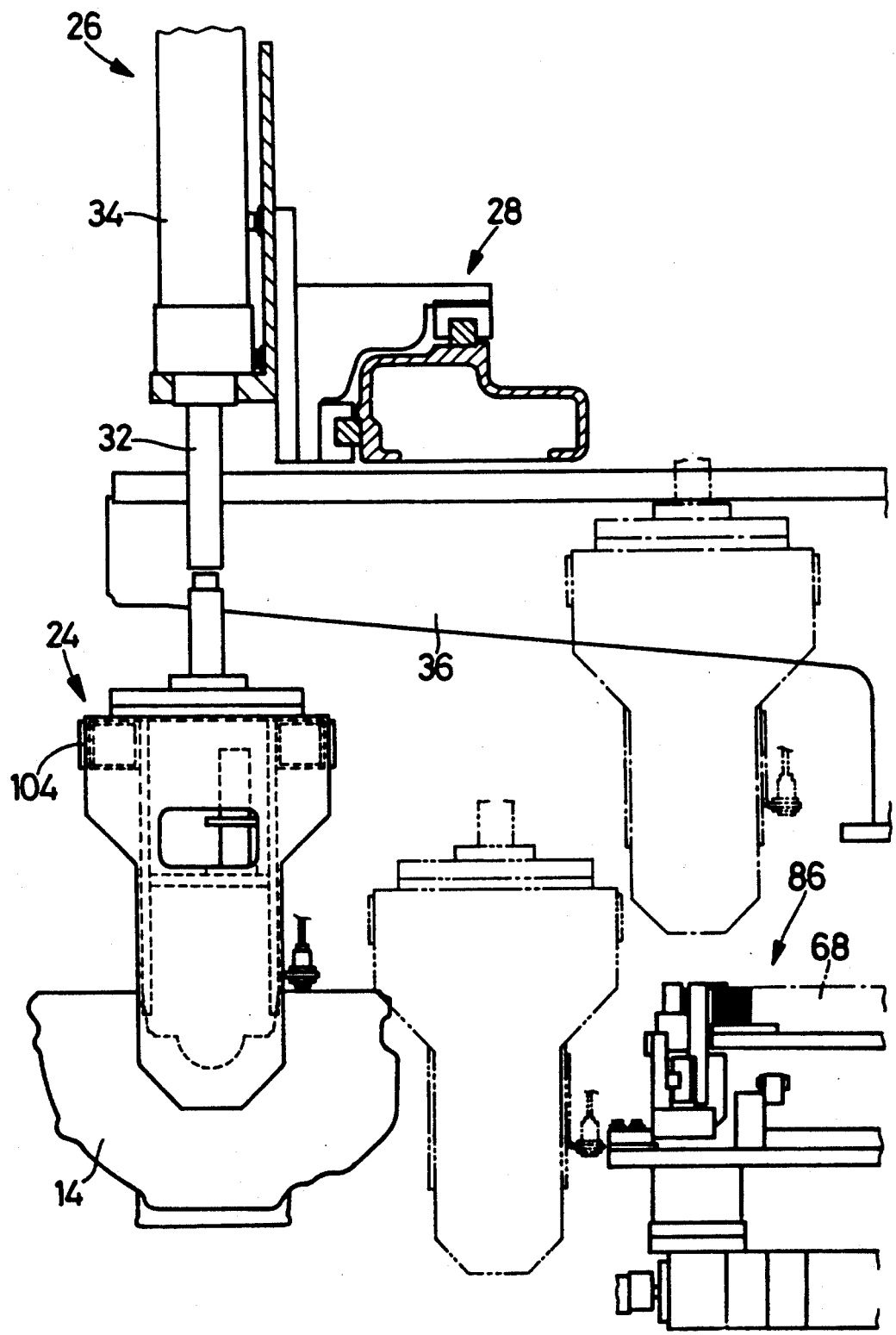
FIG. 3 is a fragmentary right-hand side elevational view of the crankshaft installing system.

As shown in the front elevational view of FIG. 2 and the right-hand side elevational view of FIG. 3, the crankshaft installing system 10 has a chucking device 24 which is supported by a Z-axis feed device 26 such that the chucking device 24 is movable up and down in a vertical or Z-axis direction. The Z-axis feed device 26 is supported by a Y-axis feed device 28 so that the Z-axis feed device 26 is movable in a substantially horizontal Y-axis direction, namely, movable right and left as seen in FIG. 2. The Y-axis feed device 28 is supported by an X-axis feed device 30 so that the Y-axis feed device 28 is movable in a substantially horizontal X-axis direction perpendicular to the Y-axis direction, namely, movable back and forth in the direction perpendicular to the plane of FIG. 2. The cylinder block 14 and the crankshaft 16 are positioned on each pallet 20, such that the longitudinal direction of these members 14, 16 is parallel with the Y-axis direction.

The feed devices 26, 28 and 30 are equipped with respective servomotors M1, M3 and M3 (M1 and M3 shown in FIG. 1) for rotating respective ballscrews for moving respective slides linearly in the respective Z, Y and X directions, while being guided by guide rods or rails. The Z-axis feed device 26 is provided with a air cylinder 34 whose piston rod 32 is connected to the chucking device 24. The piston rod 32 is normally biased in the upward direction by a pneumatic pressure of the air cylinder 34, and is screwed to the Z-axis ballscrew so that the chucking device 24 is moved up and down by the Z-axis ballscrew. The X-axis feed device 30 is mounted on a pair of stationary support arms 36, 36.

The chucking device 24 has an elongate main frame 38 secured to the Z-axis feed device 26 so as to extend in the Y-axis direction. The main frame 38 carries at its longitudinally opposite ends two chucks 40, 42 for chucking the crankshaft 16 such that the crankshaft 16 has a posture parallel to the Y-axis direction. These rear and front chucks 40, 42 has respective air cylinders for pneumatically actuating respective chucking members so that the chucking members are moved radially inward to grip the respective rear and front ends of the crankshaft 16. The chucks 40, 42 are adapted to maintain the crankshaft 16 in a predetermined chucking position while permitting the crankshaft 16 to rotate about its axis.

The front chuck 42 for chucking the front end (left-hand side end as seen in FIG. 2) of the crankshaft 16 includes an engaging ring 44 which is engageable with the crankshaft 16 such that the ring 44 and the crankshaft 16 are not rotatable with each other, i.e., rotated together. This engaging ring 44 is rotated by a brake motor M4 in one direction, that is, in the clockwise direction as in the direction from the left toward the right of FIG. 2. The engaging ring 44 has a drive key which is engageable with a key groove formed on the outer circumferential surface of the front end portion of the crankshaft 16. The key groove extends in the axial direction of the crankshaft 16. The drive key of the ring 44 is normally biased by a spring in the rearward direction (right direction in FIG. 2), for engagement with the key groove. The drive key may be retracted against the biasing force of the spring, when the key is not aligned with the groove upon chucking of the crankshaft 16 by the front chuck 42. It is noted that FIG. 2 shows the engaging ring 44 whose drive key is in engagement with the key groove. The engagement of the key with the groove is detected by a proximity switch SW1.

Figure 6:
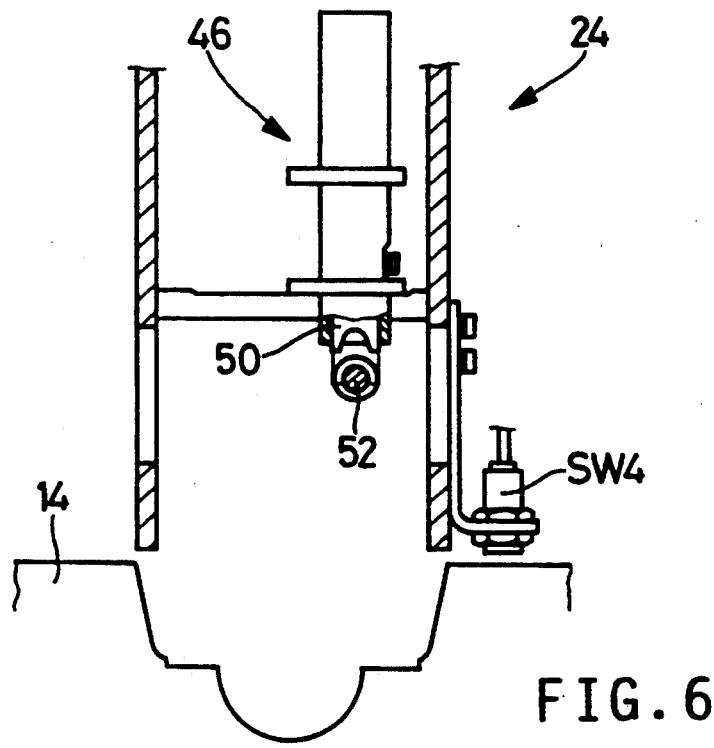
FIG. 6 is an elevational view in cross section taken along line 6—6 of FIG. 2.

The chucking device 24 has fail-safe devices 46, 48 corresponding to the rear and front chucks 40, 42, which assure the chucking of the crankshaft 16 by the chucks 40, 42, even in the event of a failure of pressurized air supply to the air cylinders due to erroneous operation of solenoid-operated valves for the chucks 40, 42, upon electric power failure, for example. As shown in FIG. 6 which is a cross sectional view taken along line 6—6 of FIG. 2, the fail-safe device 46 has a detent pin 50 which is engageable with a cutout formed in a rod 52 which is moved in response to chucking and unchucking operations of the chucks 40. The detent pin 50 is normally held in its retracted position vertically away from the rod 52, by the same air pressure as used for the air cylinders for the chucks 40, 42. In the event the air pressure supply to the air cylinder of the chuck 40 is cut off for some reason or other, the detent pin 50 is advanced by a spring incorporated in the fail-safe device 46. As a result, the pin 50 engages the rod 52, whereby the rod 52 is maintained in the chucking position to hold the chuck 40 in the chucking position. The other fail-safe device 48 for the front chuck 42 has the same arrangement as the fail-safe device 46 of FIG. 6.

Figure 4:
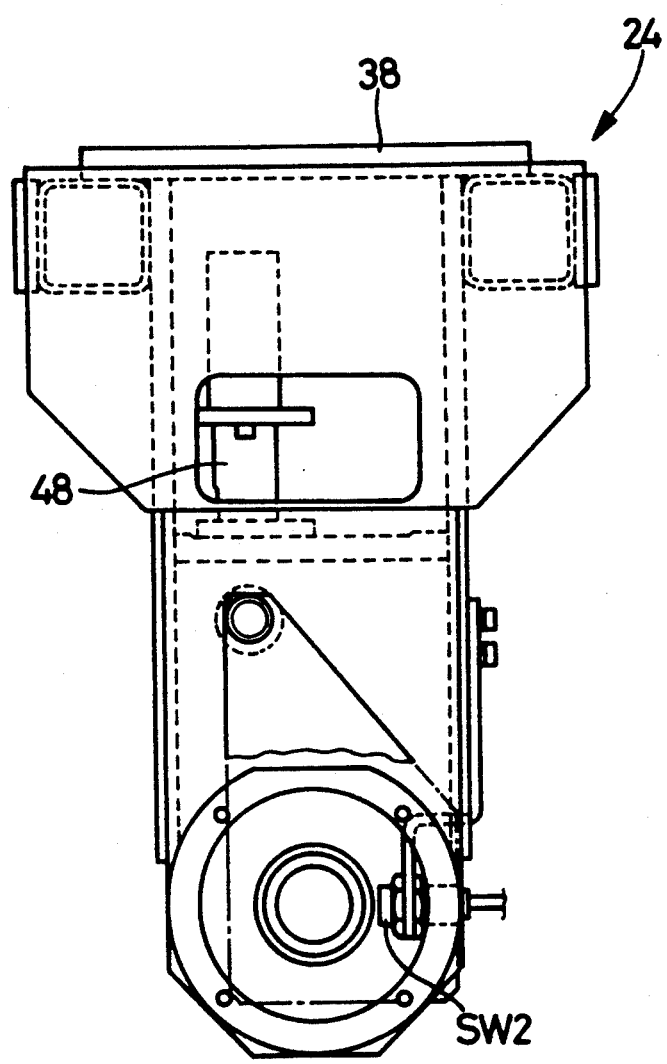
FIG. 4 is a partly cut-away left-hand side elevational view of a chucking device used in the crankshaft installing system of FIG. 1.
Figure 5:
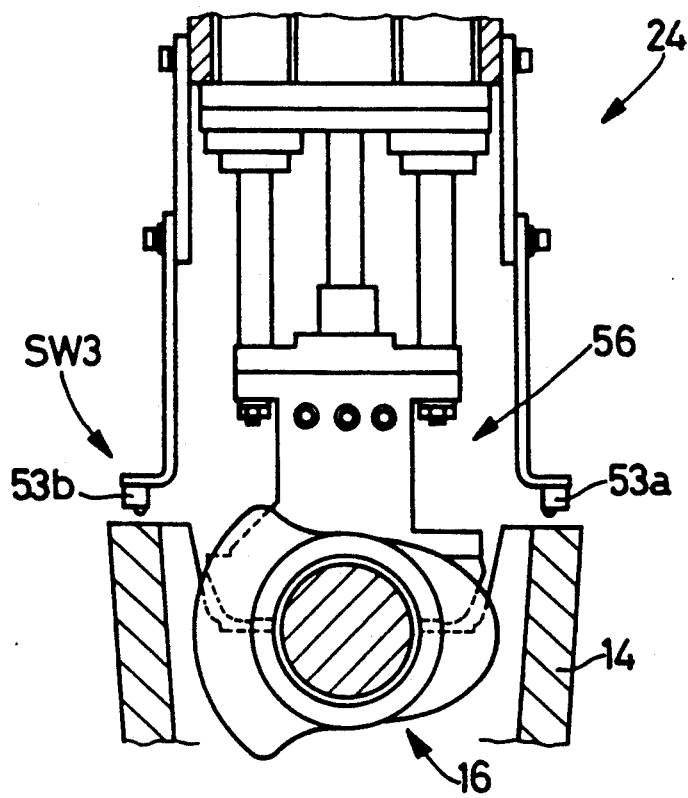
FIG. 5 is an elevational view in cross section taken along line 5—5 of FIG. 2.

As shown in FIG. 2, the chucking device 24 is provided with a proximity switch SW2 for detecting the crankshaft 16 as mounted on the pallet 20, a photoelectric switch SW3 for checking if the crankshaft 16 has a substantially horizontal posture, as detected at the crank arm portion, and a proximity switch SW4 for detecting the cylinder block 14. These switches SW2, SW3 and SW4 are also shown in the left-hand side view of the chucking device 24 in FIG. 4, cross sectional view of FIG. 5 taken along line 5—5 of FIG. 2, and cross sectional view of FIG. 6 taken along line 6—6 of FIG. 2. The photoelectric switch SW3 consists of a light emitting element 53a and a light sensitive element 53b, as shown in FIG. 5.

The chucking device 24 further has a thrust metal inserter 56 which is secured to a central portion of the main frame 38 as seen in the Y-axis direction. More specifically, the inserter 56 extends from the main frame 38 in the downward direction so that the inserter 56 is located right above a main journal 54 formed at the axially central portion of the crankshaft 16 when the crankshaft 16 is chucked by the chucks 40, 42. As shown in detail in the cross sectional view of FIG. 7 taken along line 7—7 of FIG. 2, and cross sectional view of FIG. 8 taken along line 8—8 of FIG. 7, the inserter 56 is attached to the main frame 38 such that the inserter 56 is movable in the vertical or Z-axis direction while being guided by a pair of vertically extending guide rods 58. The inserter 56 is moved up and down by a Z-axis cylinder 60.

Figure 7:
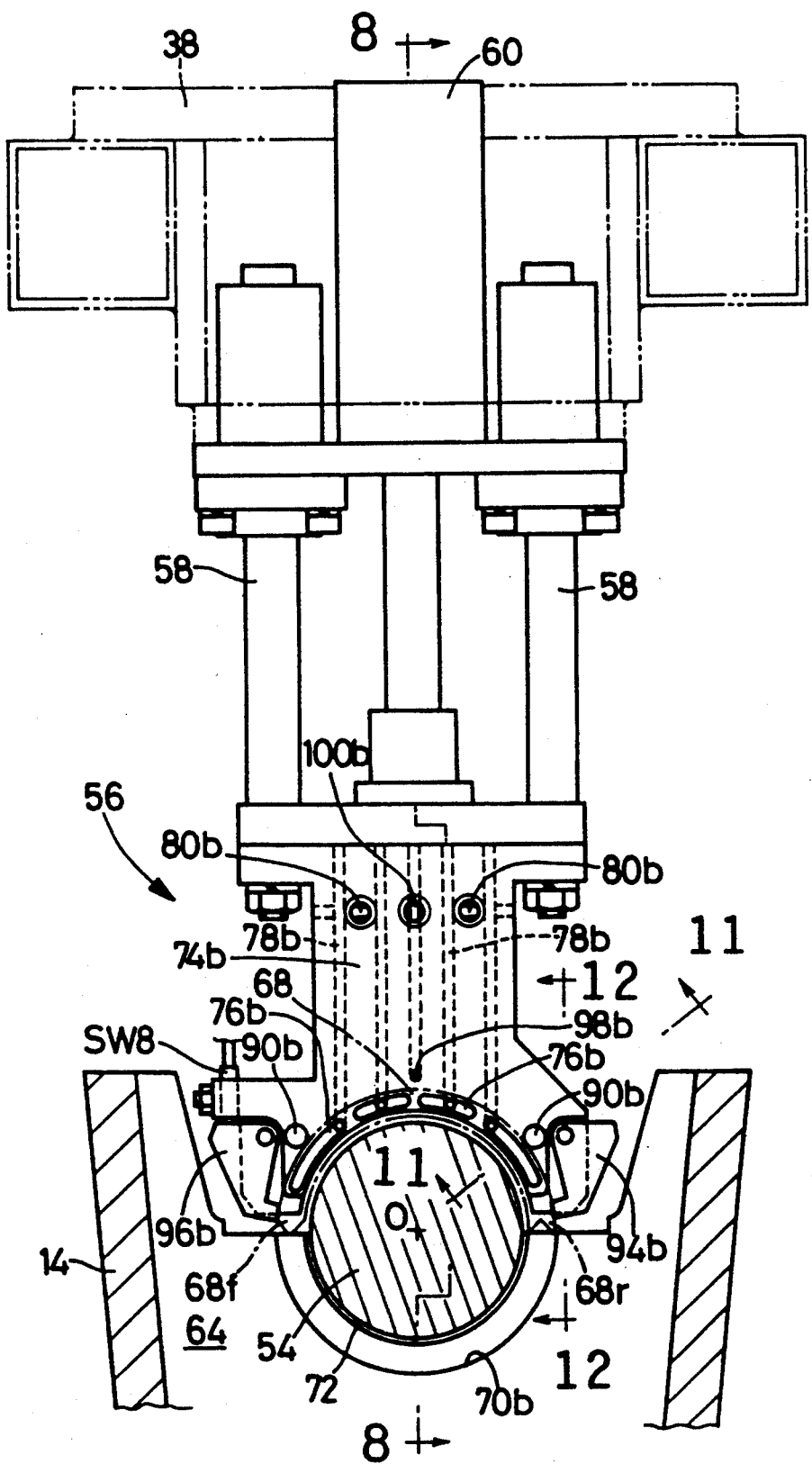
FIG. 7 is an elevational view in cross section taken along line 7—7 of FIG. 2.

The thrust metal inserter 56 is adapted to insert two upper thrust metal inserts 68, 68 into respective arcuate gaps 66a, 66b which are formed between crank arms 62a, 62b of the crankshaft 16 and a bearing portion 64 of the cylinder block 14. The arcuate gaps 66a, 66b are formed on the opposite sides of the main journal 54, which is supported by the bearing portion 64 of the cylinder block 14. Described in detail, the bearing portion 64 has a semicircularly concaved top bearing surface by which the main journal 54 of the crankshaft 16 is supported rotatably about the axis indicated at "O" in FIG. 7. The bearing portion 64 has two semicircular recesses 70a, 70b formed on its opposite end faces. These recesses 70a, 70b cooperate with the opposite surfaces of the crank arms 62a, 62b to define the pair of arcuate gaps 66a, 66b into which the semicircular upper thrust metal inserts 68 are inserted by the inserter 56. The bearing portion 64 of the cylinder block 14 has a semicircular crankshaft bearing 72 fitted on its semicircular bearing surface. It is noted that the crankshaft 16 as shown in FIGS. 7 and 8 is slightly spaced apart from the cylinder block 14, with a small clearance left between the main journal 54 and the bearing 72.

Figure 8:
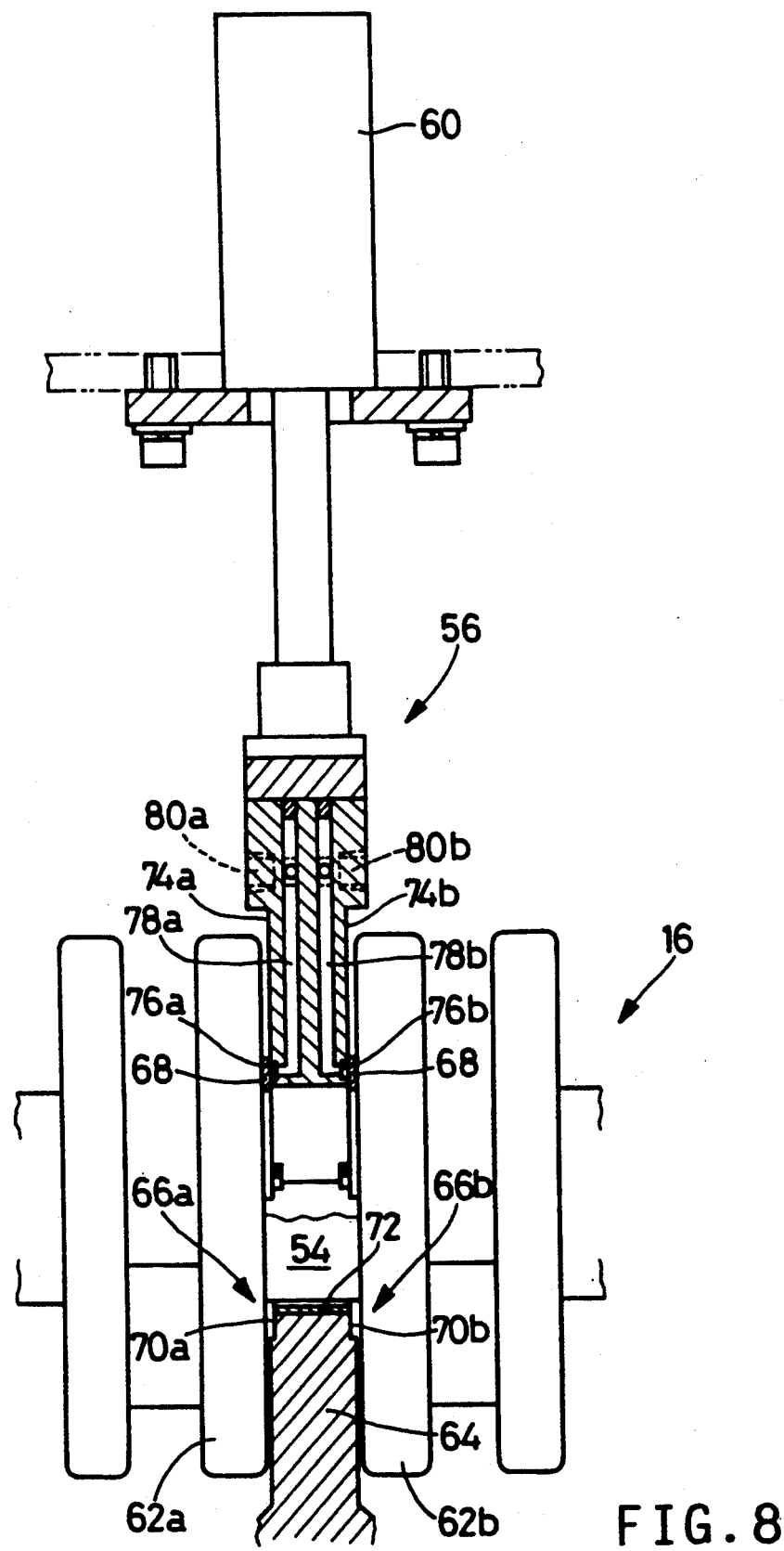
FIG. 8 is an elevational view in cross section taken along line 8—8 of FIG. 7.

The lower end portion of the inserter 56 takes the form of a plate having a thickness which is smaller than a difference obtained by subtracting the total axial dimension of the two thrust metal inserts 68 from the axial length of the main journal 54, so that the lower end portion of the inserter 56 can be inserted in between the two crank arms 62a, 62b, as indicated in FIG. 8. The lower end face of the inserter 56 has an upwardly concaved semicircular shape following the outer circumferential surface of the main journal 54, as indicated in FIG. 7. When the inserter 56 is lowered by the Z-axis cylinder 60 while the crankshaft 16 is chucked by the chucks 40, 42, the lower end face of the inserter 56 is located close to the outer circumferential surface of the main journal 54, with the semicircular arc of the end face being substantially concentric with the axial O of the main journal 54.

The inserter 56 has two semicircular grooves 76a, 76b formed in the end portions of the opposite side surfaces, namely, left and right surfaces 74a, 74b on the front and rear sides of the crankshaft 16. These semicircular grooves 76a, 76b are formed along the semicircular end face of the inserter 56. Each semicircular groove 76a, 76b is partially defined by four short arcuate areas which are arranged along the arc of the semicircular end face of the inserter 56. These arcuate areas of each groove 76a, 76b communicate with respective four communication passages 78a, 78b. Adjacent two of these passages 78a, 78b are connected to one of two connecting ports 80a, 80b, and the other adjacent two passages 78a, 78b are connected to the other port 80a, 80b. The two ports 80a, 80b are open on each of the left and right surfaces 74a, 74b. FIG. 7 shows the four communication passages 78b communicating with the semicircular groove 76b formed on the right surface 74b, and the two connecting ports 80b open in the right surface 74b. The four connecting ports 80a, 80b are connected to a pneumatic circuit shown in FIG. 9, which has a vacuum circuit 82, a pressurizing circuit 84, and four solenoid-operated two-position valves whose solenoid coils SOL1 through SOL4 are energized and de-energized for selective connection of the ports 80a, 80b to the vacuum and pressurizing circuits 82, 84.

Figure 10:
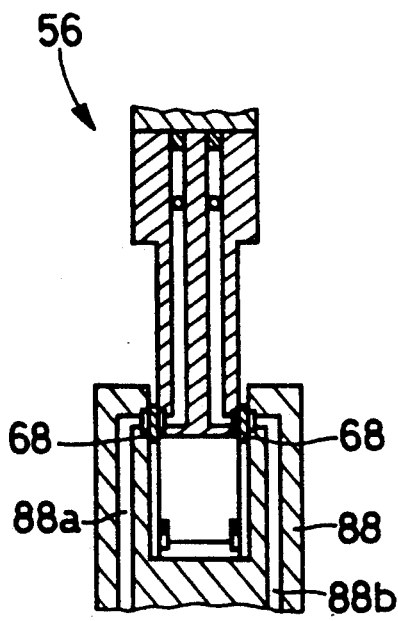
FIG. 10 is a vertical cross sectional view of a thrust metal transfer jig of a thrust metal supply provided at the rear of the crankshaft installing system of FIG. 1.

The vacuum circuit 82 incorporates a vacuum pump for applying a reduced air pressure to the semicircular grooves 76a and 76b through the corresponding connecting ports 80a and 80b, so that the thrust metal inserts 68 received in the respective grooves 76a and 76b are sucked against the end portions of the left and right surfaces 74a and 74b of the inserter 56. The thrust metal inserts 68 are stored in a thrust metal supply 86 shown in FIG. 3, and are picked up by the inserter 56. The thrust metal supply 86 has a transfer jig 88 as shown in FIG. 10, for facilitating the sucking of the two thrust metal inserts 68 by the inserter 56 such that the two inserts 68 are positioned so as to have an upwardly convex attitude and have a spacing therebetween substantially equal to the thickness of the end portion of the inserter 56. The thrust metal supply 86 is located right below the home position of the chucking device 24 indicated in one-dot chain line in FIG. 3. The pressurizing circuit 84 has a pressurizing pump for applying a blow of compressed air to the grooves 76a, 76b through the ports 80a, 80b.

Figure 9:
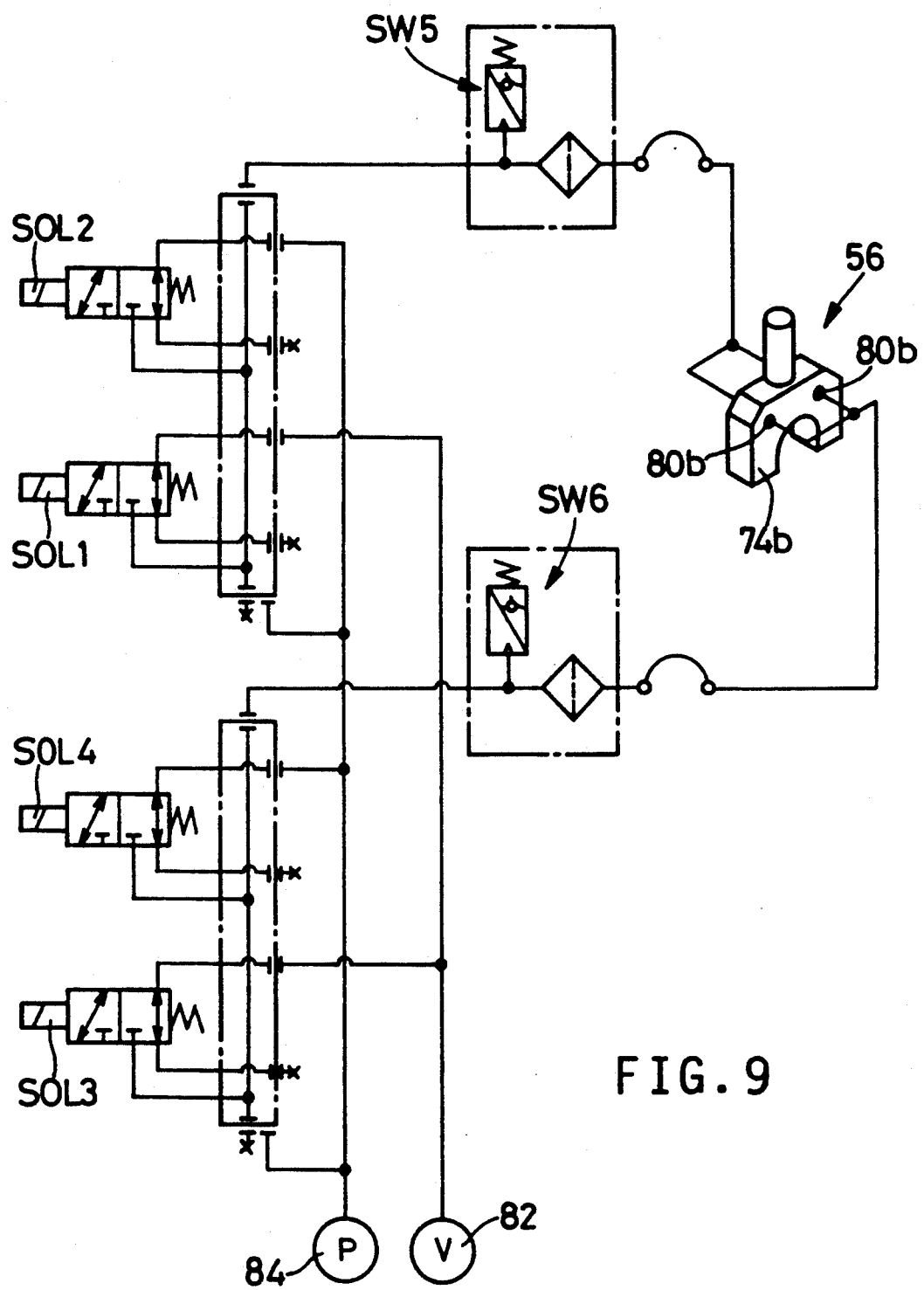
FIG. 9 is a pneumatic circuit connected to a thrust metal inserter 56 of FIGS. 7 and 8.

The pneumatic circuit of FIG. 9 has two vacuum switches SW5 and SW6 for detecting the thrust metal inserts 68 sucked on the inserter 56. The transfer jig 88 has communication passages 88a, 88b which are connected to a pneumatic circuit similar to that of FIG. 9, for selectively holding the thrust metal inserts 68 under vacuum in the jig 88 or pressing the inserts 68 against the inserter 56.

Figure 11:
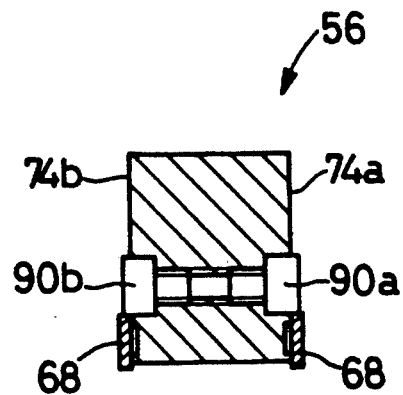
FIG. 11 is a cross sectional view taken along 11—11 of FIG. 7.

Referring back to FIG. 7, the inserter 56 has a pair of guide pins 90b on the end portion of its right surface 74b. As shown in FIG. 11, which is a cross sectional view taken along line 11—11 of FIG. 7, another pair of guide pins 90a is provided on its left surface 74a. These pairs of guide pins 90a, 90b engage the thrust metal inserts 68, as indicated in FIGS. 7 and 11. The amount of projection of each guide pin 90a, 90b from the surface 74a, 74b of the inserter 56 is smaller than the thickness of the inserts 68, a shown in FIG. 11.

Figure 12:
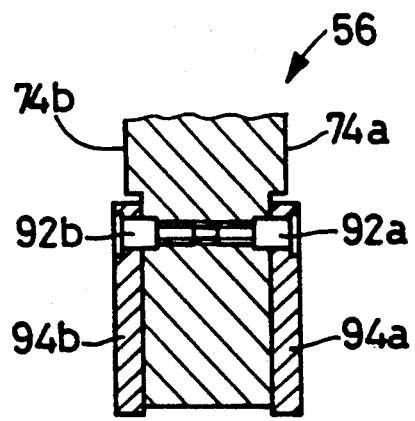
FIG. 12 is a cross sectional view taken along line 12—12 of FIG. 7.

As shown in FIG. 7, the inserter 56 carries two pivotal stops 94a, 94b at its right end on the rear side of the chucking device 24. These pivotal stops 94a, 94b, which are located near the right or rear ends of the semicircular grooves 76a, 76b, are pivotable about respective pins 92a, 92b which are parallel to the Y-axis direction, as shown in the cross sectional view of FIG. 12 taken along line 12—12 of FIG. 7. When the inserter 56 is lowered into the transfer jig 88 of FIG. 10, these pivotal stops 94a, 94b come into sliding contact with the outer arcuate surfaces of the thrust metal inserts 68, and are thus pivoted in the counterclockwise direction as seen in FIG. 7, to the position of FIG. 7 in which the stops 94a, 94b engage rear ends 68r of the inserts 68. When the inserts 68 are moved counterclockwise (as seen in FIG. 7) into the respective arcuate gaps 66a, 66b between the crankshaft 16 and the cylinder block 14 by a pusher device 200 (which will be described), the rear ends 68r are disengaged from the pivotal stops 94a, 94b, and as a result, the stops 94a, 94b are pivoted by gravity to their natural vertical position. When the inserts 68 are rotated through 180°, front ends (leading ends) 68f of the inserts 68 come into abutting contact with the stops 94a, 94b again, whereby a further counterclockwise movement of the inserts 68 is inhibited by the stops 94a, 94b. The thickness of the pivotal stops 94a, 94b is determined so that the amount of projection of these stops from the side surfaces 74a, 74b is smaller than the axial dimension of the inserts 68.

Figure 13:
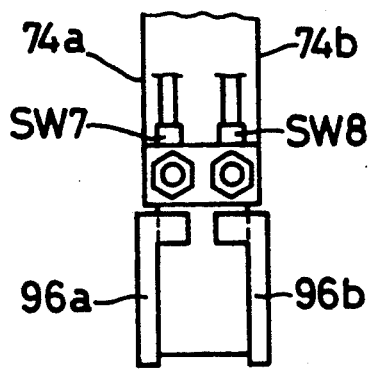
FIG. 13 is a front elevational view showing an operating end portion of the thrust metal inserter of FIGS. 7 and 8.

The inserter 56 further carries two sensing arms 96a, 96b at its left end on the front side of the chucking device 24, as shown in the front elevational view of FIG. 13. These sensing arms 96a, 96b are pivotally attached to the side surfaces 74a, 74b, such that the arms are pivotable about respective pins parallel to the Y-axis, like the pivotal stops 94a, 94b. When the inserter 56 is lowered into the transfer jig 88, the arms 96a, 96b come into sliding contact with the outer arcuate surfaces of the inserts 68, and are thus pivoted in the clockwise direction (in FIG. 7). When the inserts 68 are moved into the arcuate gaps 66a, 66b through 180° rotation, the rear ends (trailing ends) 68r are disengaged from the sensing arms 96a, 96b, whereby these arms are pivoted by gravity to their natural vertical position. Adjacent to the sensing arms 96a, 96b, there are disposed respective proximity switches SW7 and SW8 for detecting the completion of the movement of the inserts 68 into the respective arcuate gaps 66a, 66b. This detection by the switches SW7 and SW8 is based on the pivotal movements of the arms 96a, 96b. The thickness of the sensing arms 96a, 96b is also determined so that the amount of projection of these arms from the side surfaces 74a, 74b is smaller than the axial dimension of the inserts 68.

The inserter 56 has lubricating holes 98a, 98b open in the side surfaces 74a, 74b. These holes 98a, 98b are connected to a lubrication unit 102 (FIG. 17) through connecting ports 100a, 100b. The lubrication unit 102 includes a pump, and a control valve having an open position in which a lubricant is concurrently supplied to the two ports 100a, 100b, and a closed position in which the lubricant supply to the ports 100a, 100b is inhibited. FIG. 7 shows the lubrication hole 98b open in the left side surface 74a, and the connecting port 100a connected to the hole 98b.

The main frame 38 has a bracket 104 secured to its front surface, for mounting the pusher device 200 previously indicated. As shown in the right-hand side elevational view of FIG. 14 and the front elevational cross sectional view of FIG. 15, this pusher device 200 is supported by a substantially horizontal support plate 202 fixed to the bracket 104. In operation, the pusher device 200 is first moved backwards by the X-axis feed device 30 to a position right above the cylinder block 14, and is then lowered by the Z-axis feed device 26 to the position of FIGS. 14 and 15. The pusher device 200 is not shown in FIGS. 1-3.

Described more specifically, the pusher device 200 includes a main block 206 fixed to the upper surface of the support plate 202, and two rotary cylinders 208, 210 mounted on the main block 206 such that the cylinders 208, 210 are parallel to the Y-axis direction and are spaced apart from each other in the Z-axis direction. The output shafts of the cylinders 208, 210 are connected to respective synchronizing links 212, 214 which have the same length and which are rotated together. Each of these links 212, 214 is connected at one end thereof to a connecting bar 220 through a hinge pin 216, 218 such that the links 212, 214 are pivotable relative to the connecting bar 220.

Figure 14:
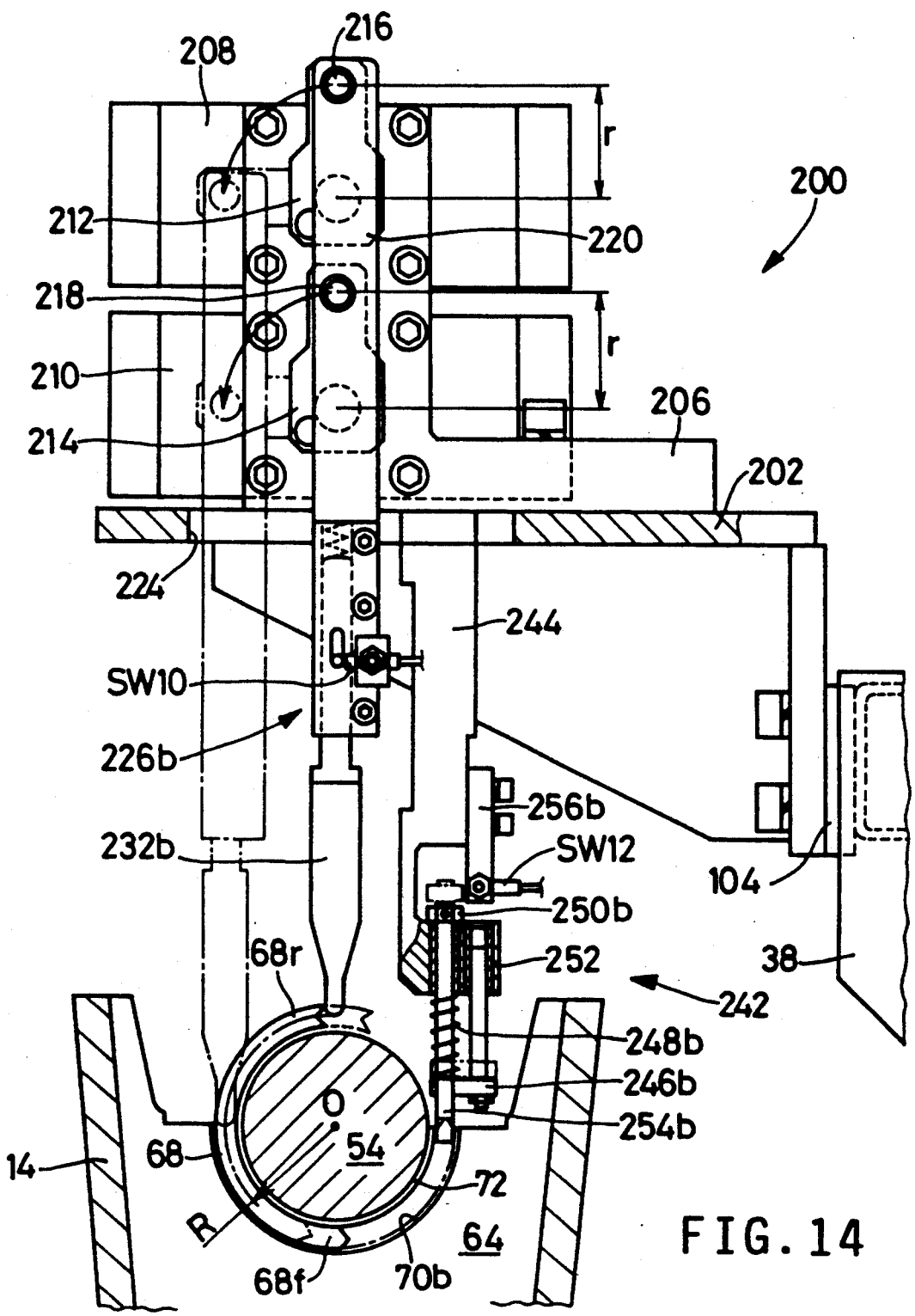
FIG. 14 is a partly cut-away right-hand side elevational view of a pusher device used in the crankshaft installing system of FIG. 1.
Figure 15:
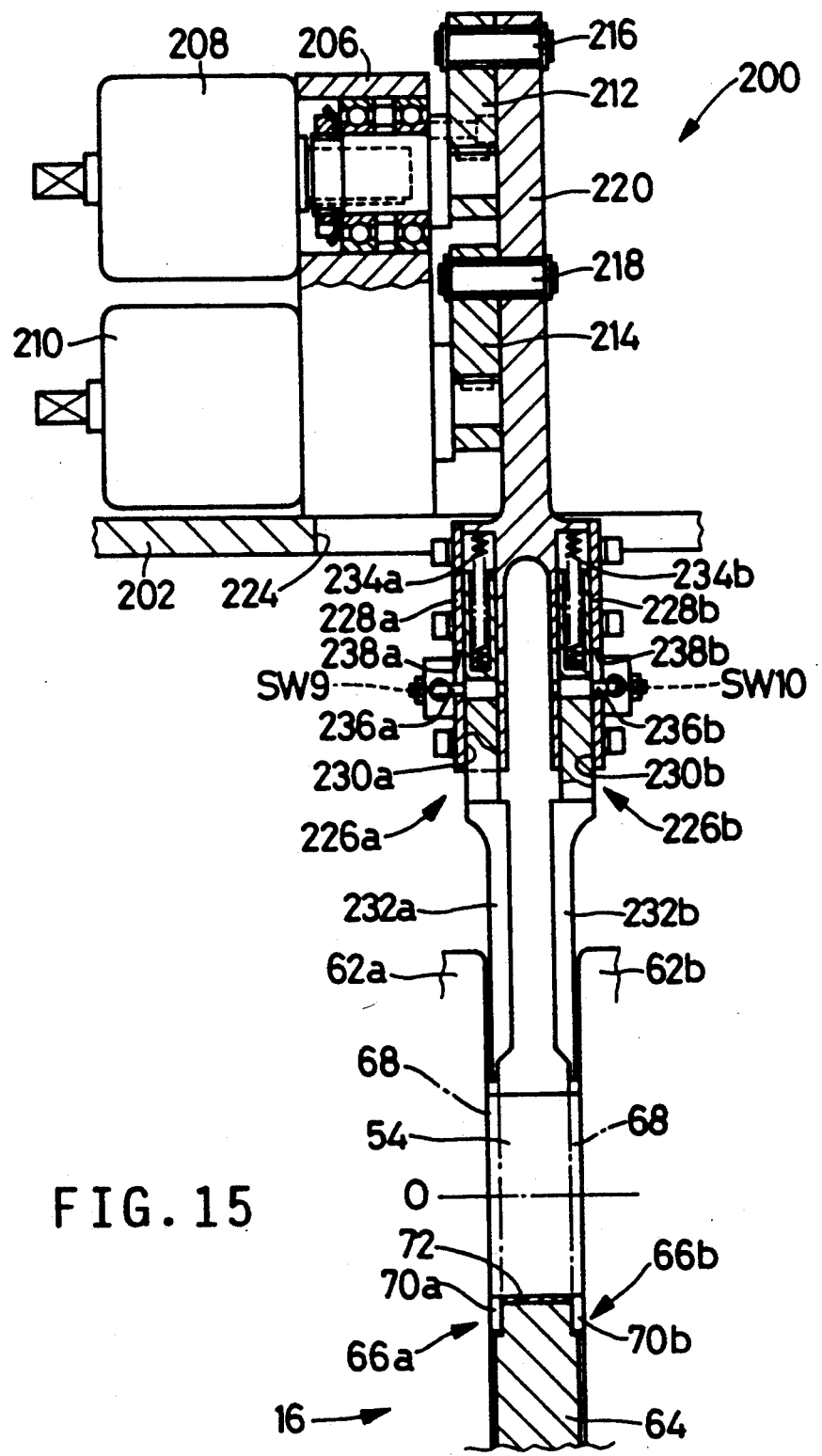
FIG. 15 is a partly cut-away front elevational view of the pusher device of FIG. 14.

The rotary cylinders 208, 210 are supplied with compressed air through a common control valve, for substantially concurrently pivoting the links 212, 214 between a first vertical position indicated in solid lines in FIG. 14, and a second horizontal position indicated in one-dot chain lines in FIG. 14. The first and second positions have a 90° angular spacing, so that the second position is established by rotating the links 212, 214 counterclockwise through 90° from the first position, for example. During the pivotal movements of the links 212, 214 between the first and second positions, the hinge pins 216, 218 describe arcs having the same radius "r", which is equal to an arc radius "R" of the semicircular thrust metal inserts 68. Accordingly, the connecting bar 220 is lowered in the Z-axis direction while simultaneously translated in the X-axis direction, with any point on the bar 220 taking a 90° arcuate path of movement whose radius is equal to the radius R. Thus, the bar 220 is moved from a first upper position indicated in solid lines in FIG. 14 to a second lower position indicated in one-dot chain lines in FIG. 14.

The connecting bar 220 is a vertically elongate member whose lower portion extends downward through a cutout 224 in the support plate 202, and is bifurcated to provide a pair of holders 226a, 226b which are spaced apart from each other in the Y-axis direction. The pusher device 200 is attached to the support plate 202 such that the connecting bar 220 has the same position as the thrust metal inserter 56 in the Y-axis direction. That is, the bar 220 is located right in front of the inserter 56 in the X-axis direction. The bar 220 is brought to the position right above the main journal 54 of the crankshaft 16 mounted on the cylinder block 14, by moving the chucking device 24 backwards in the X-axis direction by a suitable distance from the position at which the inserter 56 is right above the main journal 54.

The holder 226b on the rear (right) side of the crankshaft 16 has a vertical groove formed on the outer surface such that its lower end is open in the end face of the holder 226b. This groove is closed by a cover plate 228b to thereby define an attaching hole 230b. A pusher bar 232b is movably inserted at its upper end portion into the attaching hole 230b, and is normally biased in the downward direction by a compression coil spring 234b. The pusher bar 232 has an engaging pin 236b secured thereto, for engagement with a vertically elongate hole 238b formed through the holder 226b and cover plate 228b. Thus, the pusher bar 232b is normally held in its advanced position of FIG. 15, which position is determined by the lower end of the elongate hole 238b. The pusher bar 232b is movable in the upward direction against the biasing action of the spring 234b. A proximity switch SW10 is disposed near the pin 236b, for detecting the advanced position of the pusher bar 232b, by detecting the pin 236b. The other holder 226a of the pusher device 200 has the same construction as the other holder 226b, for holding a pusher bar 232a on the front side of the crankshaft 16. The above description of the holder 226b and pusher bar 232b applies to the holder 226a and pusher bar 232a. The advanced position of the pusher bar 232a is detected by a proximity switch SW9.

Before the rotary cylinders 208, 210 are activated, the pusher device 200 is lowered by the Z-axis feed device 26 to its lower position while the connecting bar 220 is held in the first vertical position. Accordingly, the lower end of the pusher bar 232b, for example, is located right above the axis "O" of the main journal 54, with a spacing therebetween equal to the radius "R" in the Z-axis direction, and a small amount of clearance with respect to the inner surface of the rear crank arm 62b in the Y-axis direction. In this position, the lower end of the pusher bar 232b is almost in engagement with the rear or trailing end 68r of the corresponding thrust metal insert 68. The length of the pusher bar 232b and the lowered position of the pusher device 200 are determined so as to position the pusher bar 232b as described above. If more than one half of the entire length of the insert 68 has not been inserted into the semicircular groove 70b, as indicated in two-dot chain line in FIG. 14, the pusher bar 232b abuts on the outer arcuate surface of the insert 68 when the pusher device 200 is lowered to its lower position. In this case, the pusher bar 232b is pushed back with its upper end moving upward in the hole 230b. This abnormal condition is detected by the proximity switch SW10.

When the rotary cylinders 208, 210 are activated to move the connecting bar 220 from the upper position to the lower position while the pusher device 200 is placed in the lower position of FIG. 14, the lower end of the pusher bar 232b is moved along the arc whose radius is equal to "R" and whose center lies on the axis "O". As a result, the insert 68 is pushed at its rear end 68r, whereby the entire length of the insert 68 is inserted into the corresponding arcuate gap 66b (semicircular groove 70b), as indicated in one-dot chain line in FIG. 14. It is noted that the biasing be sufficient for preventing the pusher bar 232b from moving upward into the attaching hole 230b, due to a reaction force produced during movement of the pusher bar 232b to insert the insert 68.

The pusher bar 232a on the front side of the crankshaft 16 is operated in the same manner as the pusher bar 232b, to insert the front side insert 68 into the other arcuate gap 66a, as the rear side insert 68 is inserted by the pusher bar 232b.

Figure 16:
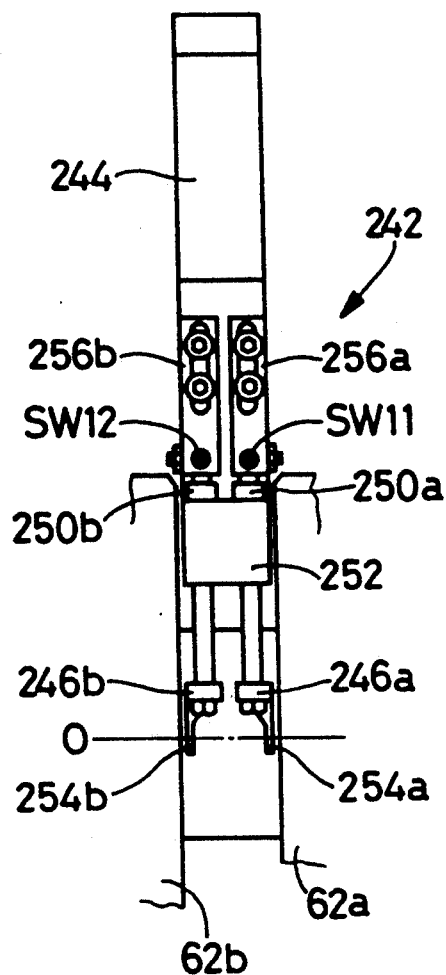
FIG. 16 is a rear elevational view of an insertion detecting device provided in the pusher device of FIG. 14.

An insertion detecting device 242 is provided on the side of the crankshaft 16 opposite to the side on which the pusher bars 232a, 232b take the arcuate path about the axis "O", namely, located to the right of the pusher bars 232a, 232b as seen in FIG. 14. This detecting device 242 is adapted to check if the inserts 68 have been correctly inserted into the arcuate gaps 66a, 66b. The device 242 has a mounting block 244 fixed to the lower surface of the main block 206 of the pusher device 200. As shown the rear elevational view of FIG. 16, the mounting block 244 has a guide 252 at its lower end portion, and a pair of detector bars 246a, 246b vertically movably supported by the guide 252. These bars 246a, 246b are biased in the downward direction by respective compression coil springs 248a, 248b, so that sensing portions 250a, 250b provided on the upper ends of the bars 246a, 246b are placed in their lower position in which the sensing portions 250a, 250b abut on the upper surface of the guide 252. In this position, the bars 246a, 246b are movable upward against the biasing action of the springs 248a, 248b.

The detector bars 246a, 246b carry respective jaws 254a, 254b which have a thickness smaller than the axial dimension of the thrust metal inserts 68. When the pusher device 200 is moved to the lower position, the jaws 254a, 254b are slightly inserted into the respective arcuate gaps 66a, 66b. When the front and rear thrust metal inserts 68 have been entirely inserted into the respective gaps 66a, 66b by the pusher bars 232a, 232b, the front or leading ends 68f of the inserts 68 contact the respective jaws 254a, 254b, thereby pushing up the respective detector bars 246a, 246b The mounting block 244 has a pair of proximity switches SW11, SW12, which detect the movements of the sensing portions 250a, 250b to their upper position by the upward movements of the bars 246a, 246b by the inserts 68. Thus, the completion of insertion of the inserts 68 into the gaps 66a, 66b is sensed by the insertion detecting device 242.

The crankshaft installing system 10 constructed as described above is controlled by a control system as illustrated in FIG. 17, which includes a control device 110 incorporating a central processing unit CPU, a random-access memory RAM, and a read-only memory ROM. The control device 110 controls the crankshaft installing system 10, according to various control programs stored in the ROM, while utilizing a temporary data storage function of the RAM. The control programs include programs for performing operations as illustrated in the flow charts of FIGS. 18 through FIG. 22 and the time chart of FIG. 23. The control device 110 further incorporates a clock generator which serves as a timer T (which will be described).

The control device 110 is adapted to receive signals generated by the switches SW1 through SW12, and other signals generated by other sensors or detectors such as: a detector for detecting that the chucking device 24 has been lifted to the uppermost position by the Z-axis feed device 26; a detector for detecting that the thrust metal inserter 56 has been lifted and lowered to the uppermost or lowermost position by the Z-axis cylinder 60; a detector for detecting that the lower ends of the pusher bars 232a, 232b have been located at the upper or lower end of the arcuate path of movements by the rotary cylinders 208, 210; a detector for detecting that the crankshaft 16 is chucked or unchucked by the chucks 40, 42; and a detector for detecting that the detent pins 50 of the fail-safe devices 46, 48 are placed in the upper position.

The control device 110 is adapted to apply drive signals to an X-axis motor driver circuit 112, a Y-axis motor driver circuit 114 and a Z-axis motor driver circuit 116, for numerically controlling the servomotors M1, M2 and M3. The servomotors M1, M2 and M3 have respective rotary encoders, which generate position signals indicative of angular positions of the motors. These position signals are received by the control device 110. The control device 110 also controls a solenoid control device for energizing and de-energizing the solenoid coils SOL1-SOL4 of the pneumatic circuit of FIG. 9, for applying vacuum or compressed air to the inserter 56, and solenoid coils of other pneumatic circuits for controlling the Z-axis cylinder 60, rotary cylinders 208, 210, air cylinders for the chucks 40, 42, and the fail-safe devices 46, 48. The control device 110 further applies drive signals to a motor driver circuit 120 for controlling the brake motor M4 for the engaging ring 44, and a control signal to the lubrication unit 102 for controlling the supply of the lubricant to the inserter 56.

Referring next to the flow charts of FIGS. 18 through FIG. 22 and the time chart of FIG. 23, there will be described a sequence of operation of the crankshaft installing system 10.

Initially, step S1 is executed to supply compressed air to the fail-safe devices 46, 48, for retracting the detent pins 50 against the biasing force of the springs. Then, step S2 is executed for operating the thrust metal inserter 56 to receive the thrust metal inserts 68 from the thrust metal supply 86.

Figure 19:
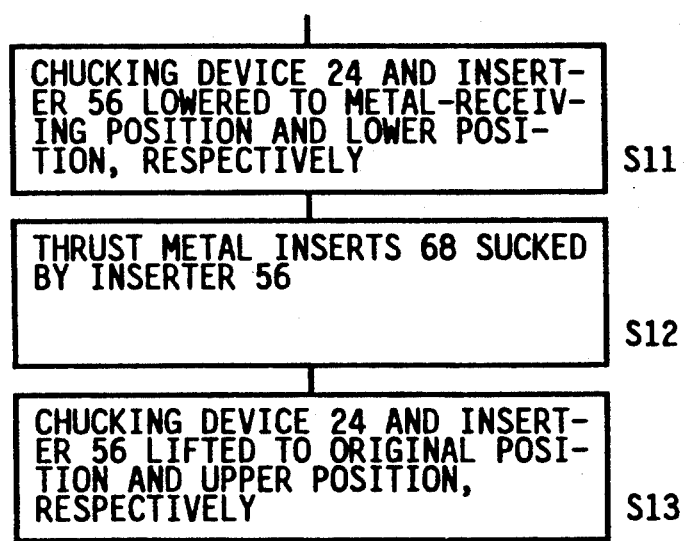
FIG. 19 is a flow chart showing specific events of operation to be performed in step S2 of the flow chart of FIG. 18.
Figure 20:
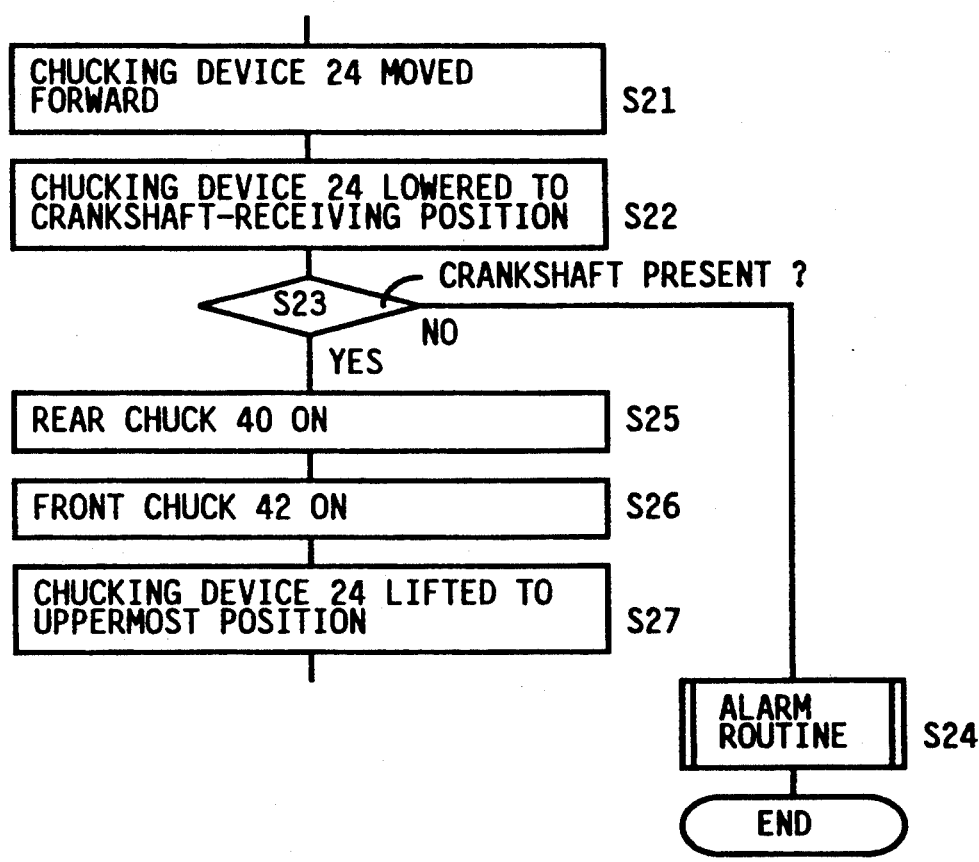
FIG. 20 is a flow chart showing specific events of operation to be performed in step S3 of FIG. 18.
Figure 21A:
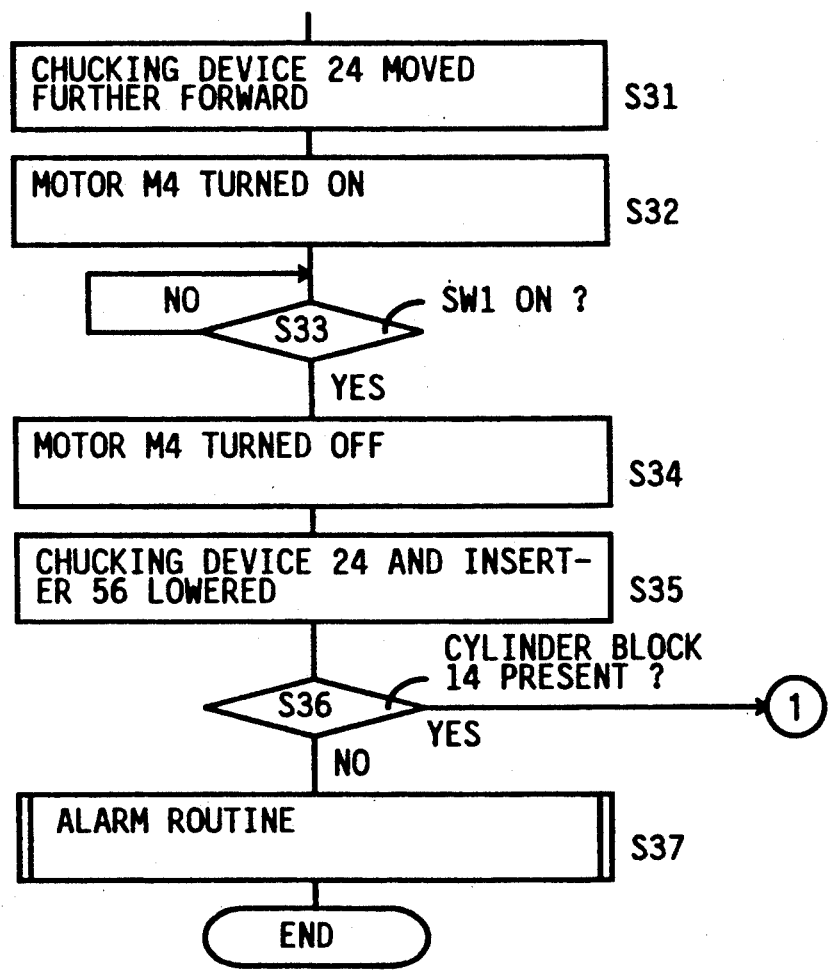
FIGS. 21a–21c are a flow chart showing specific events of operation to be performed in step S4 of FIG. 18.
Figure 21B:
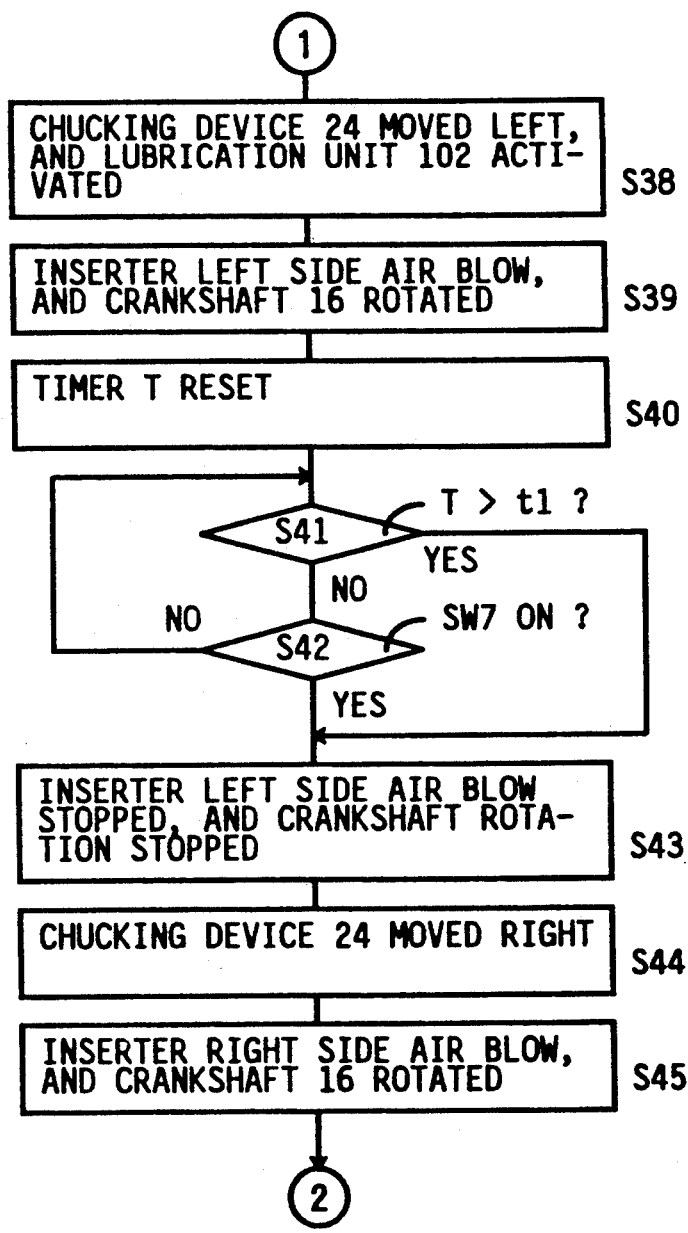
Figure 21C:
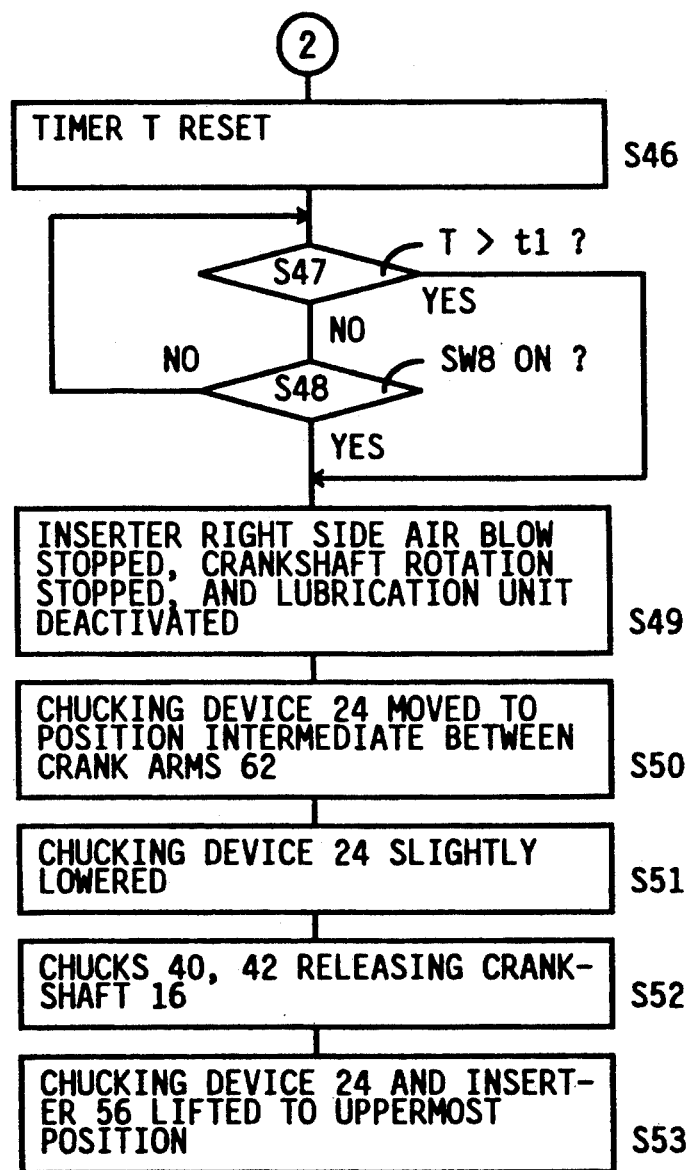

The operation in step S2 is shown in detail in the flow chart of FIG. 19. In step S11, the chucking device 24 placed in its home position indicated in one-dot chain line in FIG. 3 is lowered by the Z-axis feed device 26 to the predetermined metal-receiving position, while the inserter 56 is lowered by the Z-axis cylinder 60 to the lower position. As a result, the lower end of the inserter 56 is inserted into the transfer jig 88 of the thrust metal supply 86, so as to pick up the two thrust metal inserts 68 set in the jig 88, as shown in FIG. 10.

Step S11 is followed by step S12 in which the solenoid coils SOL1 and SOL3 are energized so that the semicircular grooves 76a, 76b formed on the left and right surfaces 74a, 74b of the inserter 56 are held under vacuum. At the same time, compressed air is blown against the inserts 68, from the communication passages 88a, 88b of the jig 88 which have been held under vacuum. Consequently, the two inserts 68 are pressed against the respective surfaces 74a, 74b and sucked on these surfaces. When the sucking of the inserts 68 has been detected based on the signals from the vacuum switches SW5 and SW6, step S13 is implemented to activate the Z-axis feed device 26 for lifting the chucking device 24 to the home position, and operate the Z-axis cylinder 60 to lift the inserter 56 to its upper position.

Figure 18:
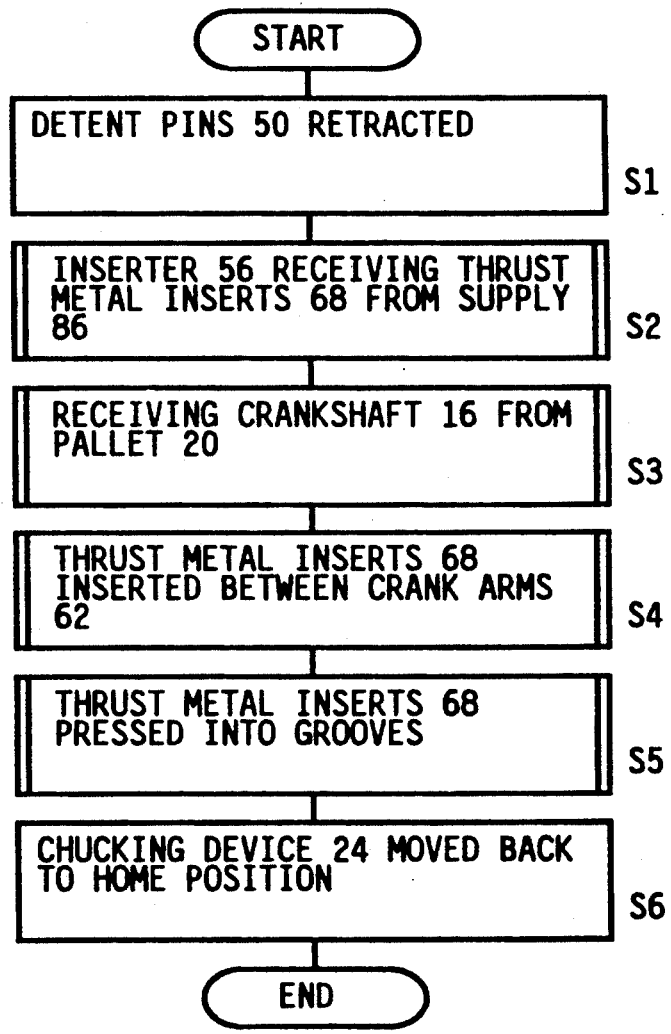
FIG. 18 is a flow chart illustrating a sequence of operation of the crankshaft installing system of FIG. 1.

Thus, the operation in step S2 of FIG. 18 is completed. This operation for the inserter 56 to receive the thrust metal inserts 68 is indicated at Ta in the time chart of FIG. 23.

The control flow then goes to step S3 in which the chucking device 24 receives the crankshaft 16 from the pallet 20. This step S3 is illustrated in detail in the flow chart of FIG. 20, wherein step S21 is initially implemented to activate the X-axis feed device 30 for advancing the chucking device 24 from the home position. Step S21 is followed by step S22 in which the chucking device 24 is lowered by the Z-axis feed device 26, to the crankshaft-receiving position indicated in two-dot chain lines in FIG. 3. In this crankshaft-receiving position, the centerlines of the chucks 40, 42 are substantially aligned with the axis "O" of the crankshaft 16 on the pallet 20. The movements of the chucking device 24 in the X-axis direction by the X-axis feed device 30 are not initiated until the control device 110 has detected a signal indicating that the device 24 is placed in the uppermost position (home position).

Then, step S23 is implemented to determine, based on the signal from the proximity switch SW2, whether the crankshaft 16 is positioned in place on the pallet 20. If the crankshaft 16 is not present on the pallet 20, the control flow is terminated with the execution of step S24 in which an alarm routine is implemented to turn on an alarm lamp or return the chucking device 24 to the home position, for example. Normally, the crankshaft 16 is positioned in place on the pallet 20, and the control flow goes to step S25 in which the rear chuck 40 is activated to chuck and position the rear end of the crankshaft 16. Step S25 is followed by step S26 in which the front chuck 42 is activated to chuck the front end of the crankshaft 16. However, the rear and front chucks 40, 42 may be concurrently activated.

The control flow then goes to step S27 to activate the Z-axis feed device 26 for lifting the chucking device 24 to the uppermost position. Thus, the operation in step S3 of FIG. 18 is completed. This operation is indicated at Tb in the time chart of FIG. 23.

Step S3 is followed by step S4 to mount the crankshaft 16 on the cylinder block 14 and insert the thrust metal inserts 68 between the crank arms 62a, 62b. This step S4 is illustrated in detail in the flow chart of FIGS. 21A, 21B and 21C. Initially, step S31 is executed to activate the X-axis feed device 30 to advance the chucking device 24 a further distance so that the advanced chucking device 24 is located right above the cylinder block 14 on the pallet 20. Then, step S32 is implemented to turn on the motor M4. The motor M4 is kept on until the proximity switch SW1 has been turned ON, namely, until an affirmative decision (YES) is obtained in the next step S33. The proximity switch SW1 is turned ON when the drive key of the engaging ring 44 has engaged the key groove formed at the front end of the crankshaft 16, as a result of rotation of the ring 44 by the motor M4. In this condition, the crankshaft 16 can be rotated with the ring 44.

When the proximity switch SW1 is turned ON and the affirmative decision is obtained in step S33, the control flow goes to step S34 to turn off the motor M4, and then to step S35 in which the chucking device 24 is lowered by the Z-axis feed device 26, while the inserter 56 is lowered to the lower position by the Z-axis cylinder 60. As a result, the crankshaft 16 is mounted on the cylinder block 14 such that the main journal 54 is almost in engagement with the bearing portion 64. At the same time, the lower end of the inserter 56 is inserted between the crank arms 62a, 62b of the crankshaft 16. The lower position of the chucking device 24 is determined so that there exists a predetermined small clearance between the circumferential surface of the main journal 54 of the crankshaft 16 and the surface of the crankshaft bearing 72 of the bearing portion 64, and so that the two thrust metal inserts 68 held by the inserter 56 are located at a circumferential position of the main journal 54 which is opposite to the bearing portion 64 in the diametric direction of the main journal 54, such that the semicircular inserts 68 are substantially concentric with the semicircular grooves 70a, 70b formed on the opposite end faces of the bearing portion 64.

It will be understood that the inserter 56, vacuum circuit 82 for causing the inserter 56 to hold the inserts 68 by vacuum suction, and Z-axis cylinder 60 cooperate to constitute a major portion of means for positioning the inserts 68 in between the crank arms 62a, 62b as described above.

The control flow then goes to step S36 to determine, based on the signal from the proximity switch SW4, whether the cylinder block 14 is positioned in place on the pallet 20. If the cylinder block 14 is not present or not positioned in place on the pallet 20, step S36 is followed by step S37 in which an alarm routine is implemented to turn on an alarm lamp or return the chucking device 24 to the home position, for example. In this case, the operation of the system 10 is terminated. When the cylinder block 14 is positioned in place on the pallet 20, step S36 is followed by step S38 in which the Y-axis feed device 28 is activated to move the chucking device 24 a small distance toward the front chuck 40, in the Y-axis direction, while the lubrication unit 102 is activated to deliver a lubricant to the inserts 68 through the lubricating holes 98a, 98b. As a result of movement of the chucking device 24 toward the front chuck 40, i.e., in the left direction as seen in FIG. 8, the amount of the gap 66a between the bearing portion 64 of the cylinder block 14 and the front side crank arm 62a is increased to thereby facilitate the insertion of the front side insert 68 into the gap 66a.

Step S38 is followed by step S39 in which the solenoid coils SOL1 and SOL2 are turned off and on, respectively, so that the front side insert 68 in the corresponding semicircular recess 76a is subjected to a compressed air blow of about 6 kg/cm$^2$, for example. Further, the motor M4 is turned on to rotate the crankshaft 16 at about 30 r.p.m., for instance. As a result of the compressed air blow from the semicircular recess 76a of the inserter 56, the front side insert 68 held on the front surface 74a of the inserter 56 is forced against the surface of the front side crank arm 62a. The rotation of the crankshaft 16 in the above condition will cause the front side insert 68 to rotate with the crankshaft 16, due to friction between the front side insert 68 and the crank arm 62a, whereby the front side insert 68 is forced into the corresponding gap 66a. The lubricant delivered from the hole 98a functions to increase the adhesion of the front side insert 68 and the crank arm 62a, and protect the front side insert 68 from damage upon movement thereof into the gap 66a.

It will be understood that the pressurizing circuit 84 and the inserter 56 cooperate to constitute a major portion of means for forcing the inserts 68 against the crank arms 62a, 62b, and that the chucks 40, 42, motor M4 and engaging ring 44 cooperate to constitute a major portion of means for rotating the crankshaft 16. It is noted that a risk of removal of the crankshaft bearing 72 off the bearing portion 64 of the cylinder block 14 during rotation of the crankshaft 16 is prevented by the clearance left between the main journal 54 of the crankshaft 16 and the bearing 72.

Step S39 is followed by step S40 in which the timer T is reset to start measuring the time after the motor M4 is activated. The control flow then goes to step S41 to determine whether the content of the timer T exceeds a predetermined time t1, or not. If the time lapse after the activation of the motor M4 is shorter than the time t1, a negative decision (NO) is obtained in step S41, and step S42 is implemented to determine whether or not the proximity switch SW7 has been turned ON, namely, whether the front side insert 68 has been inserted into the corresponding gap 66a. Steps S41 and S42 are repeatedly executed until an affirmative decision (YES) is obtained in either of the two steps S41 and S42. The time t1 is determined to be sufficient for inserting the insert 68 into the gap 66a over more than one half of the entire length, even under a comparatively bad condition of the insert in terms of burrs and warpage, for example. The time t1 may be set to about five seconds, for instance.

When the affirmative decision is obtained in step S41 or S42, step S43 is implemented to turn off the solenoid coil SOL2, to stop the compressed air blow into the groove 76a, and turn off the motor M4 to stop the rotation of the crankshaft 16. The control flow then goes to step S44 to activate the Y-axis feed device 28 for moving the chucking device 24 toward the rear chuck 40, i.e., in the right direction as seen in FIG. 8, so as to increase the amount of the rear side gap 66b. Then, steps S45 through S49 similar to steps S39 through S43 are implemented to insert the rear side insert 68 into the rear side gap 66b, in the manner similar to that for the front side insert 68. In step S49, the rotation of the crankshaft 16 is stopped based on the signal from the photoelectric switch SW3, so that the crank arms 62a, 62b have a substantially horizontal attitude. The lubrication unit 102 is turned off in step S49.

Then, the control flow goes to step S50 to activate the Y-axis feed device 28 for returning the chucking device 24 in the left direction, so as to position the crankshaft 16 relative to the cylinder block 14 such that the bearing portion 64 of the cylinder block 14 is intermediate between the two crank arms 62a, 62b. Step S50 is followed by step S51 in which the Z-axis feed device 26 is activated to lower the chucking device 24 by a short distance so that the main journal 54 is snugly fitted on the bearing portion 64 (crankshaft bearing 72). Then, step S52 is executed to bring the rear and front chucks 40, 42 to the unchucking position to release the crankshaft 16. Step S52 is followed by step S53 in which the Z-axis feed device 26 is activated to lift the chucking device 24 to the uppermost position, while the Z-axis cylinder 60 is operated to lift the thrust metal inserter 56 to its upper position. With the front chuck 42 placed in the unchucking position, the drive key of the engaging ring 44 is disengaged from the groove of the crankshaft 16, whereby the crankshaft 16 is released from the chucking device 24.

Thus, the operation in step S4 of FIG. 18 is completed. This operation to insert the inserts 68 into the gaps 66a, 66b is indicated at Tc in the time chart of FIG. 23.

Figure 22:
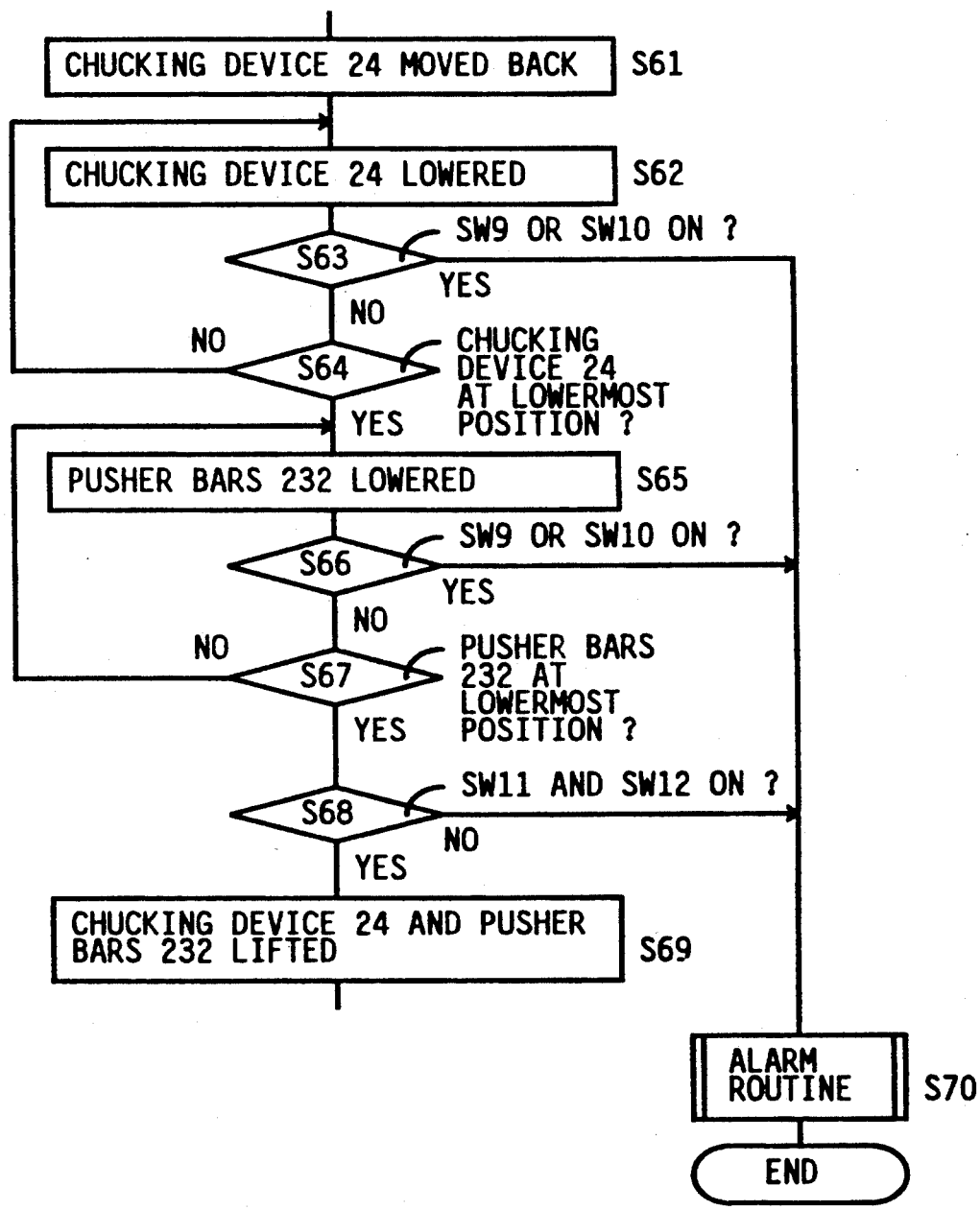
FIG. 22 is a flow chart showing specific events of operation to be performed in step S5 of FIG. 18.
Figure 23:
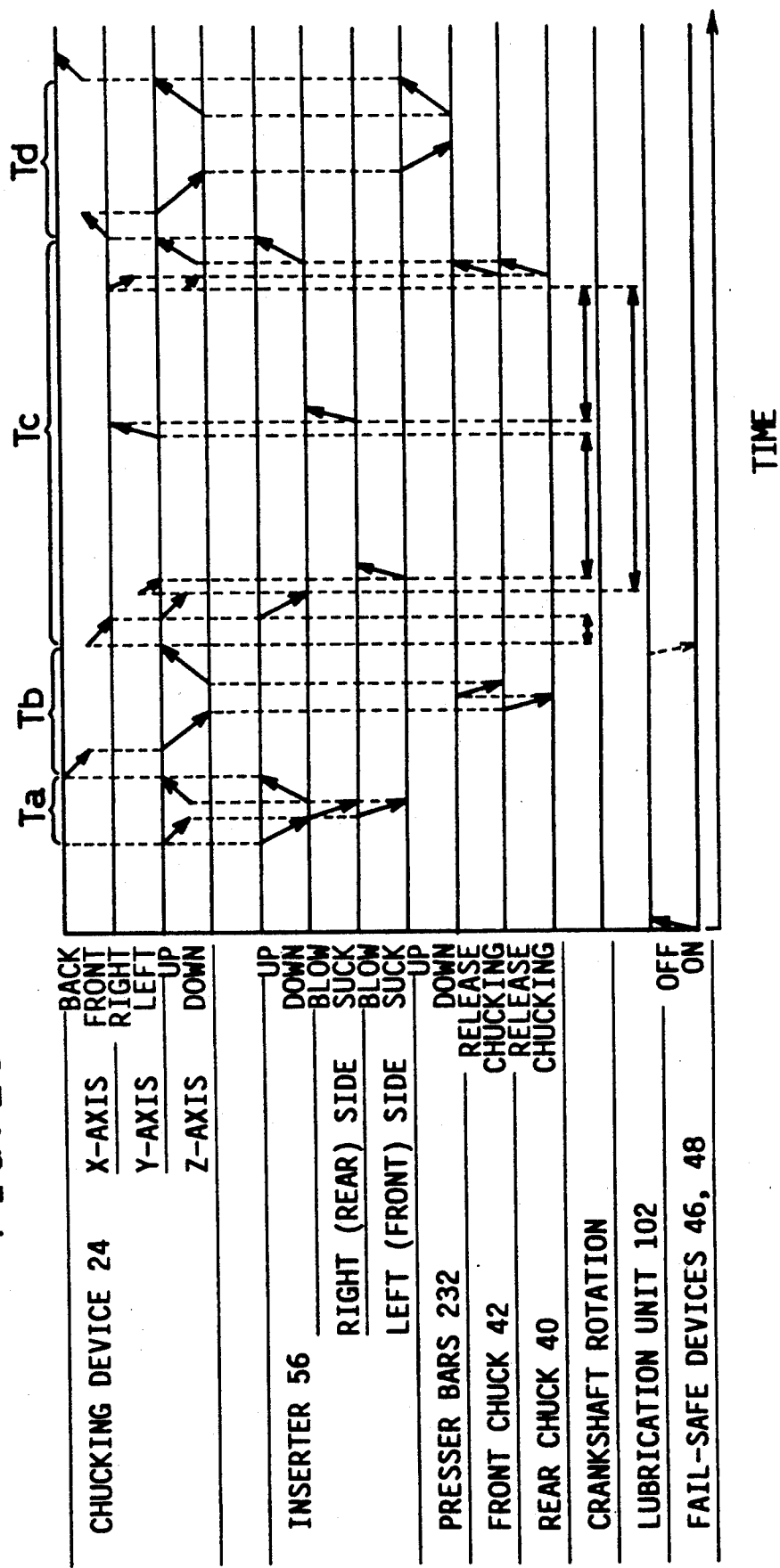
FIG. 23 is a time chart illustrating the sequential events of operation of the crankshaft installing system.

Then, the control flow goes to step S5 of FIG. 18, which is shown in detail in the flow chart of FIG. 22. Initially, step S61 is executed to activate the X-axis feed device 30 for moving the chucking device 24 backwards so that the pusher device 200 is located right above the cylinder block 14. Then, step S62 is executed to activate the Z-axis feed device 26 for lowering the chucking device 24. At this time, the connecting bar 220 of the pusher device 200 is held in its upper position. If the two inserts 68 have been inserted into the gaps 66a, 66b over more than one half of the entire length thereof, the pusher bars 232a, 232b are kept in their advanced position. If the length of insertion of the inserts 68 into the gaps 66a, 66b is less than one half of the entire length, the pusher bars 232a, 232b are pushed back into the holes 230a, 230b, at their upper end portions, whereby the proximity switches SW9 and SW10 are turned on. In view of this, step S62 is followed by step S63 to determine whether or not at least one of the two switches SW9 and SW10 has been turned on. If an affirmative decision (YES) is obtained in step S63, the pusher device 200 is not operable for forcing the inserts 68 into the gaps 66a, 66b. In this case, step S70 is implemented to execute an alarm routine to turn on an alarm lamp or return the chucking device 24 to the home position, for example, and the operation of the system 10 is terminated.

If the chucking device 24 has been lowered to the lowermost position, without the switch SW9 or SW10 being turned on, an affirmative decision (YES) is obtained in step S64, and the control flow goes to step S65 in which the rotary cylinders 208 and 210 are activated to move the connecting bar 220 from the upper position to the lower position, taking the arcuate locus having the radius R. As a result, the pusher bars 232a, 232b attached to the lower end of the bar 220 are accordingly moved, with their lower ends taking the similar arcuate locus along an upper left quarter of the outer circumferential surface of the main journal 54 of the crankshaft 16. Consequently, the front and rear side inserts 68 are forced over their entire length into the semicircular gaps 66a, 66b. However, the pusher bars 232a, 232b may be pushed back into the holes 230a, 230b, if the resistance to movement of the inserts 68 exceeds a certain limit due to sticking of the inserts or for other reasons. In this event, the inserts 68 cannot be correctly inserted into the gaps 66a, 66b. To avoid this undesirable phenomenon, step S66 is implemented to again check if the switch SW9 and/or switch SW10 is/are turned on. If an affirmative decision (YES) is obtained in step S66, the alarm routine in step S70 is effected as described above. It is noted that the lubricant delivered in step S4 by the inserter 56 functions to assure comparatively smooth insertion of the inserts 68 by the pusher bars 232a, 232b, and effectively prevent damaging the inserts 68. However, another supply of the lubricant may be provided before or upon lowering of the pusher bars 232a, 232b in step S65.

If the pusher bars 232a, 232b have been lowered to the lower position along the arcuate locus indicated above, an affirmative decision (YES) is obtained in step S67 following step S66, and step S68 is executed to determine whether both of the switches SW11 and SW12 have been turned on, i.e., whether the two inserts 68 have been entirely inserted into the respective gaps 66a, 66b by the pusher bars 232a, 232b. If an affirmative decision (YES) is obtained in step S68, step S69 is implemented to operate the rotary cylinders 208, 210 for lifting the connecting bar 220 to the upper position, and activate the Z-axis feed device 26 for lifting the pusher device 200 to the uppermost position. If either one of the switches SW11, SW12 is turned on, due to chipping, warpage or other flaws of the inserts 68, a negative decision (NO) is obtained, and the alarm routine of step S70 is implemented.

Thus, the operation in step S5 of FIG. 18 is completed. This operation to force the inserts 68 into the gaps 66a, 66b is indicated at Td in the time chart of FIG. 23.

Then, the control flow goes to step S6 of FIG. 18, in which the X-axis feed device 30 is activated to return the chucking device 24 to the home position. Thus, a series of operations of the crankshaft installing system 10 is completed.

The crankshaft 16 as installed on the cylinder block 14 by the system 10 is shown in FIG. 24, together with the upper thrust metal inserts 68 inserted in the respective gaps 66a, 66b. The pallet 20 carrying the cylinder block 14 with the crankshaft 16 mounted thereon is then fed by the conveyor 22 to the bearing cap mounting system 12, for mounting the bearing cap 18 together with the lower thrust metal inserts 122. The bearing cap 18 to be mounted on the journal 54 has a crankshaft bearing 126 fitted therein. Since the crankshaft 16 is oriented such that the crank arms 62a, 62b have a substantially horizontal attitude, the mounting of the bearing cap 18 is not disturbed by the crank arms 62a, 62b and a counterweight 124. It is noted that the cylinder block 14 is turned upside down when installed on a vehicle as part of an engine.

As discussed above, the present crankshaft installing system 10 incorporates an apparatus which uses the inserter 56 for positioning the thrust metal inserts 68 between the crank arms 62a, 62b and which is adapted to rotate the crankshaft 16 while the inserts 68 are forced against the arms 62a, 62b by compressed air pressure, whereby the inserts 68 are rotated with the crankshaft 16, and are thereby inserted into the gaps 66a, 66b. Accordingly, the cost and labor needed to inserting the inserts 68 into the gaps 66a, 66b are considerably reduced. In particular, the present system 10 is equipped with the pusher device 200 adapted to mechanically forcing the inserts 68 into the gaps 66a, 66b over the entire length of the inserts. Thus, the only requirement imposed on the user of the system 10 is to monitor the operation for any abnormality of the system. Accordingly, a pre-assembly line for an engine may be further automated by the present system 10.

It is also noted that since the inserts 68 are inserted into the gaps 66a, 66b by rotation of the inserts 68 with the crankshaft 16 due to friction between the inserts 68 and the crank arms 62a, 62b, the inserts 68 are suitable protected against damage or deformation during the insertion. The delivery of a lubricant to the inserts 68 according to the present embodiment is also effective to avoid damaging the inserts. Further, the present embodiment wherein the inserts 68 accommodated in the supply 86 are picked up by vacuum suction by the inserter 56 is less likely to damage the inserts 68, as compared with an arrangement which uses a mechanical chuck for holding and transferring the inserts.

Moreover, the insertion of the inserts 68 is facilitated by increasing the amount of the gaps 66a, 66b by moving the crankshaft 16 in the appropriate Y-axis direction toward or away from the engaging ring 44.

It is further noted that the provision of the pusher device 200 in combination with the inserter 56 assures complete insertion of the inserts 68, within a relatively short time, significantly shortening the cycle time and improving the operational reliability of the system 10. The inserts 68 would be damaged or deformed if the inserts whose front ends 68f abut on the top surface of the bearing portion 64 of the cylinder block 14 were forced into the gaps 66a, 66b. In the present embodiment, however, the front ends 68f have been inserted into the gaps 66a, 66b before the inserts 68 are mechanically pushed a further distance by the pusher bars 232a, 232b. Since the inserts 68 are guided between the arms 62a, 62b and the bearing portion 64 during movements by the pusher bars, the inserts 68 are almost free from damage or deformation.

The reliability of the system 10 is further improved by the checking in step S68 of FIG. 22 based o the signals from the switches SW11 and SW12, to confirm that the inserts 68 have been correctly inserted in place in the gaps 66a, 66b. In the present embodiment wherein step S5 is always executed prior to step S6, the inadequate insertion of the inserts 68 may be detected without fail, although step S5 of FIG. 18 may be skipped with step S4 directly followed by step S6, if the affirmative decision is obtained in steps S42 and S48 of FIGS. 21B and 21C, with the signals from the switches SW7 and SW8 indicating that the inserts 68 have been inserted by the rotation of the crankshaft 16.

While the present invention has been described in its presently preferred embodiment by reference to the accompanying drawings, it is to be understood that the invention may be otherwise embodied.

For example, the pusher device 200 is not essential and may be eliminated. In this case, the length of time during which the motor M4 is rotated is suitably determined so that the inserts 68 can be entirely inserted into the gaps 66a, 66b by rotation of the inserts 68 with the crankshaft 16 while the inserts 68 are pneumatically pressed against the crank arms 62a, 62b. If the inserts 68 cannot be entirely inserted in the gaps, the operator of the system 10 may manually push the inserts 68 in place.

Although the inserter 56 uses vacuum pressure for holding the inserts 68 by vacuum suction, other suitable holding means such as electromagnet or a mechanical gripper for chucking the inserts 68 at their periphery may be used for positioning the inserts 68 in between the crank arms 62a, 62b.

In the illustrated embodiment, compressed air blows are used to force the inserts 68 against the surfaces of the crank arms 62a, 62b. However, the inserts 68 may be forced against the arms 62a, 62b by other means, for example, a semicircular member which carries a plurality of rollers which are arranged along an arc corresponding to the inserts 68, such that the rollers are rotatable about respective axes extending in radial directions of the arc. In operation, this semicircular member is moved toward the inserts 68 by a suitable cam mechanism, for example. The rollers may be positively driven to facilitate the rotary movement of the inserts 68 by the rotation of the crankshaft 16.

While the illustrated embodiment is adapted to simultaneously position two thrust metal inserts 68 in between the two crank arms 62a, 62b, and insert the two inserts 68 one after the other, the two inserts 68 may be brought in between the crank arms 62a, 62b, one after the other. In the illustrated embodiment, the two inserts 68 are positioned on the axially opposite sides of the bearing portion 64 of the cylinder block 14. However, the two inserts may be disposed such that one of them is positioned on one axial side of one bearing portion of the cylinder block while the other insert is position on the other axial side of another bearing portion.

Although the illustrated embodiment is adapted such that the front side insert 68 is inserted before the rear side insert 68 is inserted, it is needless to say that the rear side insert may be inserted before the front side insert. Where the amount of the gaps 66a, 66b is relatively large with respect to the thickness of the inserts 68, the two inserts 68 may be simultaneously inserted with the inserter 56 positioned intermediate the two crank arms 62a, 62b.

In the illustrated embodiment, the front side insert 68 is inserted into the gap 66a after the crankshaft 16 is moved toward the ring 44 (to the left in FIG. 2), and then the rear side insert 68 is inserted in the other gap 66b after the crankshaft 16 is moved away from the ring 44. However, it is possible that the two inserts 68 are inserted simultaneously into the respective gaps 66a, 66b with the inserts 68 forced against the arms 62a, 62b by compressed air blows while the crankshaft 16 under rotation is repeatedly reciprocated left and right to facilitate the insertion of the inserts 68 by means of friction between the inserts and the surfaces of the arms 62.

While the illustrated embodiment is adapted such that the inserter 56 is lifted and lowered by the Z-axis cylinder 60, the cylinder 60 is replaced by other feeding means such as a ballscrew driven by an electric motor.

In the illustrated embodiment, the inserter 56 is carried by the chucking device 24 provided to chuck and position the crankshaft 16 on the cylinder block 14. However, the inserter 56 may be disposed independently of the chucking device 24 and positioned by suitable means other than the chucking device 24.

The illustrated embodiment uses the pusher device 200 wherein the pusher bars 232a, 232b are moved along an arc by means of the two rotary cylinders 208, 210, synchronizing links 212, 214, and connecting bar 220. However, the pusher bars may be operated by using a single rotary cylinder. In this case, the two synchronizing links 212, 214 are synchronized by connecting them at their intermediate portions, or by using a synchronizing gear.

Figure 25:
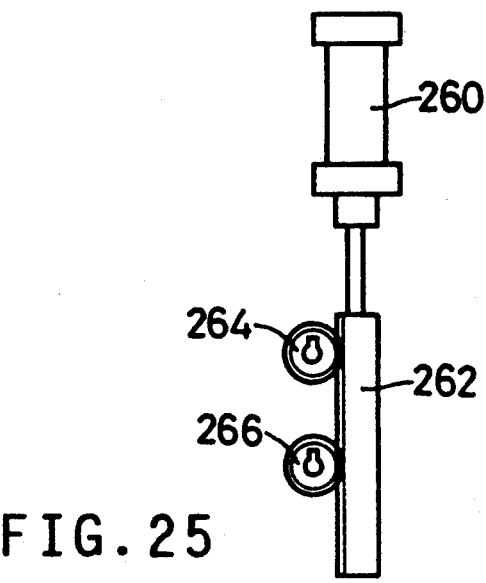
FIG. 25 is a view showing a modified form of the drive mechanism for the pusher device of FIG. 14.

Further, the pusher device 200 may use an electric motor coupled with a speed reduction gear, or a linear cylinder. FIG. 25 shows an example using a linear cylinder indicated at 260, which is adapted to linearly move a rack 262 engaging two pinions 264, 266. The synchronizing links 212, 214 are connected to the respective pinions 264, 266, so that a movement of the rack 262 will cause simultaneous pivotal movements of the links 212, 214 by the same angle, for arcuate movements of the connecting bar 220 and pusher bars 232a, 232b.

The synchronizing links 212, 214 of the pusher device 200 of the illustrated embodiment have the same length for translating the connecting bar 220 in the Y-axis direction. However, a cam mechanism rather than a link mechanism may be used provided that the lower end of the pusher bars 232a, 232b takes an arcuate path substantially following the arc of the insert 68 (circumferential surface of the main journal 54 of the crankshaft 16).

While the angle of arcuate movement of the connecting bar 220, i.e., that of the pusher bars 232a, 232b is 90°, this angle may be enlarged to about 120°. In this case, the amount of insertion of the inserts 68 by the inserter 56 in the preceding step may be accordingly reduced.

Although the illustrated embodiment is adapted to insert the front and rear inserts 68 simultaneously by the two pusher bars 232a, 232b, a single pusher member may be used to insert the two inserts 68 one after the other or at a time.

The pusher device 200 of the illustrated embodiment is carried by the chucking device 24. However, the pusher device may be disposed independently of the chucking device 24. Further, the illustrated embodiment may be modified such that the pusher device 200 is provided with a Z-axis cylinder like the cylinder 60 for lifting and lowering the pusher bars 232a, 232b, and such that the inserter 56 and the pusher device 200 are disposed movably in the X-axis direction relative to the chucking device 24, so that the inserter 56 and the pusher device 200 may be positioned right above the crankshaft 16 one after the other. In this modified arrangement, the inserter 56 and the pusher device 200 may be operated successively while the crankshaft 16 is chucked by the chucks 40, 42, and the crankshaft 16 may be rotated even while the inserts 68 are inserted by the pusher device 200.

In the illustrated embodiment, the motor M4 is operated for the predetermined time t1 for rotating the crankshaft 16 to move the inserts 68 into the gaps 66a, 66b due to friction of the inserts 68 caused by the compressed air blows with respect to the crank arms 62a, 62b. However, the motor M4 is turned off when the insertion of the insert 68 by a predetermined amount is detected based on a change in the flow rate or pressure of the compressed air, which varies depending upon the movement of the insert (presence or absence of the insert at the point of the air blow).

In the illustrated embodiment, the determination as to whether the inserts 68 have been correctly inserted or not is effected in step S68 based on the signals from the switches SW11 and SW12 after the operation of the pusher bars 232a, 232b. However, the illustrated embodiment may be modified such that the chucking device 24 is returned to the home position without the operation of the pusher bars 232a, 232b, if the completion of insertion of the inserts 68 is detected based on the signals of the switches SW11 and SW12 before the operation of the pusher bars 232a, 232b. Further, step S5 of FIG. 18 is omitted and step S4 is directly followed by step S6, if the complete insertion of the inserts 68 is detected based on the signals SW7 and SW8 after the insertion of the inserts 68 by rotation of the crankshaft 16 in step S4 of FIG. 18.

It is to be understood that the present invention may be embodied with various other changes, modifications and improvements, which may occur to those skilled in the art, in the light of the foregoing teachings.

What is claimed is:

1. A thrust metal inserting apparatus operable when a crankshaft having a journal and a crank arm at one end of said journal is positioned on a cylinder block having a bearing portion such that said journal is fitted on an arcuate concave bearing surface of said bearing portion, said bearing portion having an arcuate groove formed on an end face thereof along said arcuate bearing surface, so as to cooperate with a surface of said crank arm to define an arcuate gap, said apparatus operating to insert an arcuate thrust metal insert into said arcuate gap, said apparatus comprising:

positioning means for holding said thrust metal insert and positioning said insert at a circumferential position of said journal which is opposite to said arcuate bearing surface of said bearing portion in a diametric direction of said journal, such that said insert is substantially concentric with said arcuate groove;

pressing means for forcing said insert at said circumferential position against said surface of said crank arm, said pressing means comprising a thrust metal inserter in the form of a plate which has an arcuate end face corresponding to the outer circumferential surface of said journal, an arcuate recess formed on a side surface thereof along said arcuate end face, and an air passage communicating with said arcuate recess;

said pressing means further comprising a pressurizing circuit for supplying compressed air to said arcuate recess through said air passage, to thereby force said insert against the surface of said crank arm; and rotating means for rotating said crankshaft about an axis thereof, while said insert is forced against the surface of said crank arm by said pressing means, whereby said insert is rotated with said crankshaft and at least partially inserted into said arcuate gap.

2. A thrust metal inserting apparatus according to claim 1, wherein said positioning means comprises said thrust metal inserter, a vacuum circuit for applying vacuum pressure to said arcuate recess through said air passage to hold said insert by vacuum suction, and a control valve device for selective communication of said air passage with said pressurizing circuit or said vacuum circuit.

3. A thrust metal inserting apparatus according to claim 3, wherein said thrust metal inserter has said arcuate recess on each of opposite side surfaces of said plate, for holding a pair of thrust metal inserts by vacuum suction, so that said pair of thrust metal inserts are inserted into respective front and rear arcuate gaps formed between a pair of crank arms at opposite ends of said journal and opposite end faces of said bearing portion, said positioning means further comprising means for moving said thrust metal inserter in one of opposite axial directions of said crankshaft, together with said crankshaft, relative to said cylinder block, so as to enlarge an amount of said front arcuate gap before said crankshaft is rotated to insert one of said pair of inserts into said front arcuate gap, and moving said thrust metal inserter in the other of said opposite axial directions, together with said crankshaft, relative to said cylinder block, so as to enlarge an amount of said rear arcuate gap before said crankshaft is rotated to insert the other of said pair of inserts into said rear arcuate gap.

4. A thrust metal inserting apparatus according to claim 1, wherein said thrust metal inserter has a lubricating hole open in said side surface, said apparatus further comprising a lubrication unit for delivering a lubricant to said lubrication hole when said insert is forced against said crank arm by said compressed air.

5. A thrust metal inserting apparatus according to claim 1, further comprising pushing means having a pusher bar which is engageable with a trailing end of said arcuate thrust metal insert after at least a leading end portion of said arcuate insert has been inserted into said arcuate gap by rotation of said crankshaft by said rotating means, said pushing means being operated such that said pusher bar takes an arcuate path substantially along a part of an outer circumferential surface of said journal of said crankshaft, to insert said arcuate insert into said arcuate gap over an entire length of said insert.

* * * * *

UNITED STATES PATENT AND TRADEMARK OFFICE
CERTIFICATE OF CORRECTION

PATENT NO. : 5,189,785
DATED : March 2, 1993
INVENTOR(S) : Mitsumoto Inoguchi, Kenji Manabe, Hitomi Itoh.

It is certified that error appears in the above-identified patent and that said Letters Patent is hereby corrected as shown below:

Claim 3, column 22, line 29, "claim 3" should read --claim 2--.

Signed and Sealed this

Ninth Day of November, 1993

Attest:

BRUCE LEHMAN

*Attesting Officer*  Commissioner of Patents and Trademarks